(12) United States Patent
Tanaka et al.

(10) Patent No.: US 8,685,275 B2
(45) Date of Patent: *Apr. 1, 2014

(54) LIQUID CRYSTALLINE MEDIUM

(71) Applicant: Merck Patent GmbH, Darmstadt (DE)

(72) Inventors: Norihiko Tanaka, Kanagawa Pref. (JP); Makoto Murakami, Kanagawa Pref. (JP); Shinji Nakajima, Kanagawa Pref. (JP)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/869,392

(22) Filed: Apr. 24, 2013

(65) Prior Publication Data
US 2013/0234066 A1    Sep. 12, 2013

Related U.S. Application Data

(62) Division of application No. 12/601,567, filed as application No. PCT/EP2008/004088 on May 21, 2008, now Pat. No. 8,454,858.

(30) Foreign Application Priority Data

May 25, 2007  (EP) ..................... 07010478

(51) Int. Cl.
C09K 19/12    (2006.01)
C09K 19/52    (2006.01)
C09K 19/06    (2006.01)
C09K 19/34    (2006.01)
C09K 19/32    (2006.01)
C09K 19/30    (2006.01)
C09K 19/00    (2006.01)

(52) U.S. Cl.
USPC .............. 252/299.66; 252/299.01; 252/299.6; 252/299.61; 252/299.62; 252/299.63; 252/299.64; 252/299.65; 428/1.1; 428/1.3

(58) Field of Classification Search
USPC .............. 252/299.01, 299.6, 299.61, 299.62, 252/299.63, 299.64, 299.65, 299.66; 428/1.1, 1.3
See application file for complete search history.

(56) References Cited

U.S. PATENT DOCUMENTS

| | | | |
|---|---|---|---|
| 6,066,268 A | 5/2000 | Ichinose et al. | |
| 6,896,939 B2 | 5/2005 | Klassen-Memmer et al. | |
| 7,510,749 B2 | 3/2009 | Shimada | |
| 7,595,100 B2 | 9/2009 | Fujita et al. | |
| 7,608,310 B2 | 10/2009 | Hattori et al. | |
| 7,695,777 B2 | 4/2010 | Goto et al. | |
| 7,709,064 B2 | 5/2010 | Torii et al. | |
| 8,454,858 B2 * | 6/2013 | Tanaka et al. | 252/299.66 |
| 8,524,117 B2 * | 9/2013 | Tanaka et al. | 252/299.6 |
| 2006/0071195 A1 | 4/2006 | Tomi | |
| 2006/0198967 A1 | 9/2006 | Saito et al. | |
| 2007/0007493 A1 | 1/2007 | Hattori et al. | |
| 2007/0290169 A1 | 12/2007 | Torii et al. | |
| 2008/0011984 A1 | 1/2008 | Fujita et al. | |
| 2008/0063814 A1 | 3/2008 | Shimada | |
| 2008/0075891 A1 | 3/2008 | Goto et al. | |
| 2013/0187092 A1 * | 7/2013 | Tanaka et al. | 252/299.62 |

FOREIGN PATENT DOCUMENTS

| | | |
|---|---|---|
| EP | 1 736 526 A1 | 12/2006 |
| EP | 1 897 928 A1 | 3/2008 |
| EP | 1 903 090 A2 | 3/2008 |
| JP | 2007023071 | 2/2007 |
| JP | 2007031694 | 2/2007 |

OTHER PUBLICATIONS

Espacenet—Bibliographic data—Abstract of JP2007023071 (A)—Feb. 1, 2007—"Liquid Crystal Composition and Liquid Crystal Display Element", Yamamoto Hitoshi.
Espacenet—Bibliographic data—Abstract of JP207031694 (A)—Feb. 8, 2007—"Liquid Crystal Composition and Liquid Crystal Display Element", Hattori Norikazu.
International Search Report of PCT/EP2008/004088 (Aug. 26, 2008).

(Continued)

*Primary Examiner* — Geraldina Visconti
(74) *Attorney, Agent, or Firm* — Millen, White, Zelano & Branigan, P.C.

(57) ABSTRACT

The invention relates to a liquid-crystalline medium based on a mixture of polar compounds having negative dielectric anisotropy, which contains at least one compound of the formula I

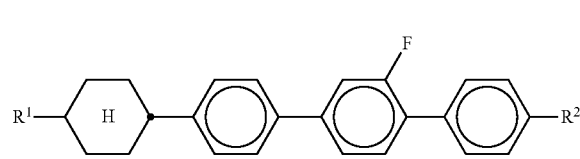

and at least one compound of the formula II

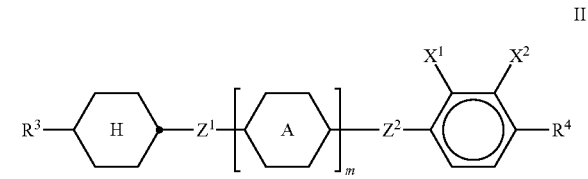

in which
$R^1$, $R^2$, $R^3$, $R^4$, ring A, $Z^1$, $Z^2$ and m are as defined in claim 1, and to the use thereof for an active-matrix display based on the ECB, VA, PS-VA, FFS, PALC or IPS effect.

23 Claims, No Drawings

(56) References Cited

OTHER PUBLICATIONS

K. Miyazawa et al., "First Synthesis of Liquid Crystalline 2,3-bis(trifluoromethyl)phenyl Derivatives Exhibiting Large Negative Dielectric Anisotropy" Crystals, vol. 29, No. 11 (2002) pp. 1483-1490.

* cited by examiner

LIQUID CRYSTALLINE MEDIUM

The invention relates to a liquid-crystalline medium based on a mixture of polar compounds having negative dielectric anisotropy, which contains at least one compound of the formula I and at least one compound of formula II

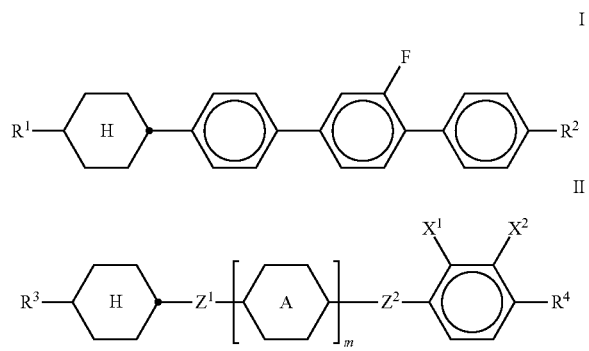

wherein
$R^1$ to $R^4$ are each independently alkyl or alkoxy with 1 to 8 C atoms, wherein one or more $CH_2$-groups are optionally replaced by —CH=CH—, —$CF_2$O, or —O— in a way that —O— atoms are not linked directly to one another,

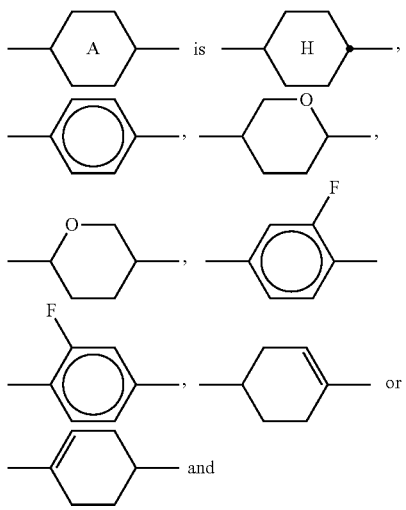

$X^1$ and $X^2$ are each independently F, Cl or $CF_3$,
$Z^1$ and $Z^2$ are each independently a single bond, —$CH_2CH_2$—, —$CH_2O$—, —$OCH_2$—, —$CF_2O$—, —$OCF_2$—, —COO—
m is 0 or 1.

Media of this type are to be used, in particular, for electro-optical displays with active-matrix addressing based on the ECB effect, for IPS (in plane switching) and for FFS (fringe field switching) displays.

The principle of electrically controlled birefringence, the ECB (electrically controlled birefringence) effect or DAP (deformation of aligned phases) effect was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta\epsilon$ of −0.5 to −5 in order to be suitable for use in high-information display elements based on the ECB effect. Electro-optical display elements based on the ECB effect have a homeotropic edge alignment. Dielectrically negative liquid-crystal media can also be used in displays which use the so-called IPS effect.

Industrial application of this effect in electro-optical display elements requires LC phases which have to satisfy a multiplicity of requirements. Particularly important here are chemical resistance to moisture, air and physical influences, such as heat, radiation in the infrared, visible and ultraviolet regions, and direct and alternating electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances which can be used as LC phases. However, it has not been possible to prepare optimum phases easily in this manner, since no liquid-crystal materials having significantly negative dielectric anisotropy and adequate long-term stability have hitherto been available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate.
2. Thin-film transistors (TFTs) on a glass plate as substrate.

In type 1, the electro-optical effect used is usually dynamic scattering or the guest-host effect. The use of single-crystal silicon as substrate material restricts the display size, since even modular assembly of various part-displays results in problems at the joins.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-compatible displays, in which a mosaic of red, green and blue filters is arranged in such a way that a filter element is opposite each switchable pixel.

The TFT displays disclosed hitherto usually operate as TN cells with crossed polarisers in transmission and are back-lit.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantage of the MLC-TN displays disclosed hitherto is due to their comparatively low contrast, the relatively high viewing-angle dependence and the difficulty of producing grey shades in these displays.

There thus continues to be a great demand for MLC displays having very high specific resistance at the same time as a wide operating-temperature range, short response times and low threshold voltage with the aid of which various grey shades can be produced.

The invention has the object of providing MLC displays which are based on the ECB, VA (vertical alignment), PS-VA (polymer stabilized-VA), IPS or FFS effect and do not have the disadvantages indicated above, or only do so to a lesser extent, and at the same time have very high specific resistance values.

It has now been found that this object can be achieved if nematic liquid-crystalline mixtures which contain at least one compound of the formula I and at least one compound of the formula II are used in these display elements.

The invention thus relates to a liquid-crystalline medium having negative dielectric anisotropy which contains at least one compound of the formula I and at least one compound of the formula II.

LC compositions containing compounds of the formula I are known from U.S. 2008/0011984A1.

Preferred embodiments of the LC media are the following:
a) $R^1$, $R^2$, $R^3$ and $R^4$ are independently of each other preferably alkyl, alkoxy or alkenyl. Alkyl and alkoxy are in each case a straight chained residue containing 1 to 6 C atoms. The term "alkenyl" comprises straight-chain and branched alkenyl groups with 2 to 7 C atoms. Straight-chain alkenyl groups are preferred. Further preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Of these, especially preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Alkenyl groups with up to 5 C atoms are particularly preferred.
b) The compounds of formula I are selected from the following formulae,

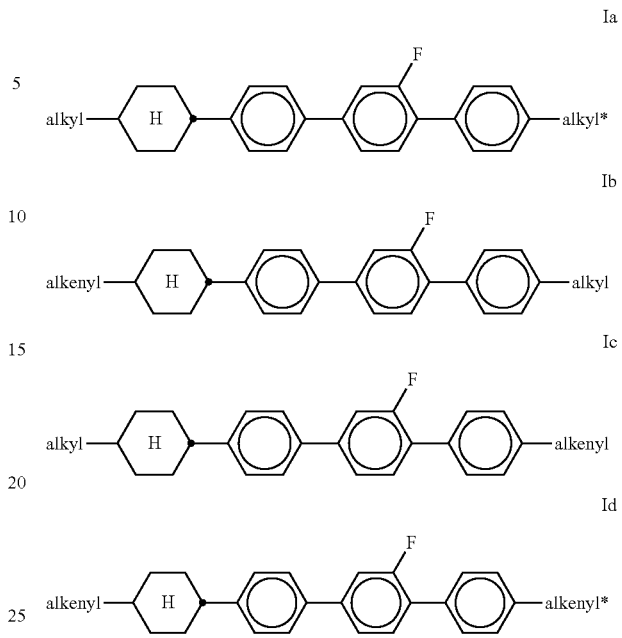

wherein "alkyl" and "alkyl*" independently of each other denote $C_{1-6}$-alkyl and "alkenyl" and "alkenyl*" independently of each other denote $C_{2-7}$-alkenyl. Especially preferred are LC media containing one or more, preferably one, two or three compounds of formula Ia preferably

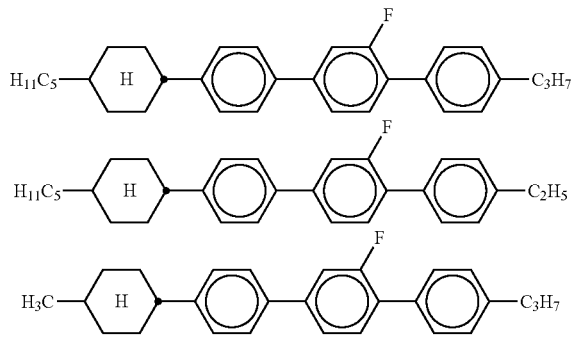

c) The compounds of formula II are selected from the following formulae IIa to IIr

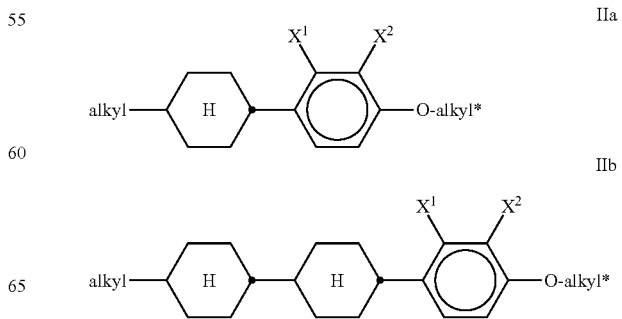

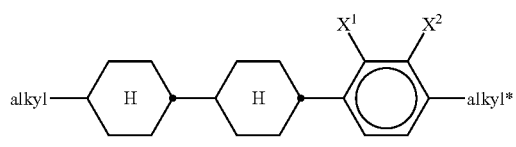
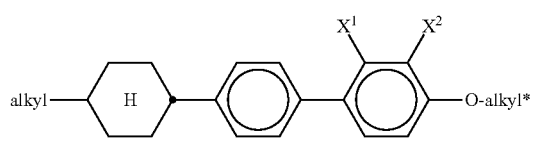
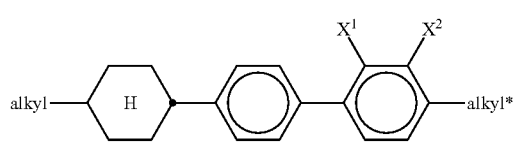
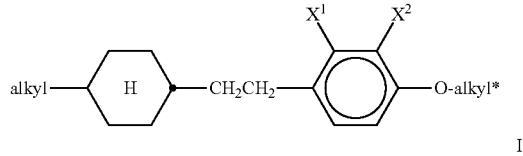
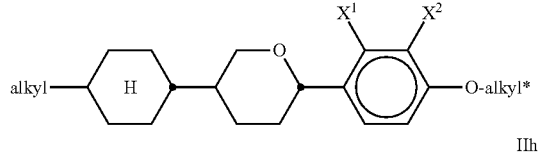
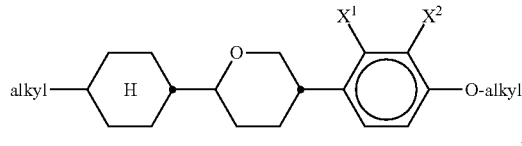
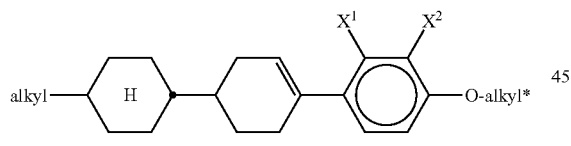
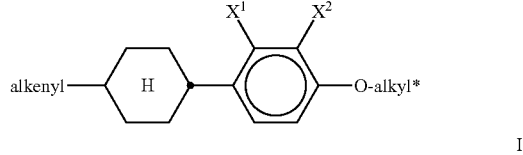
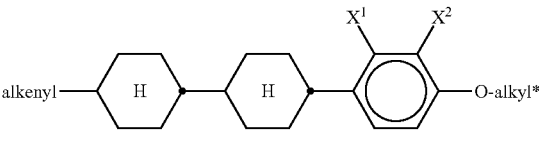
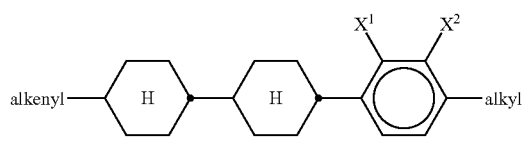

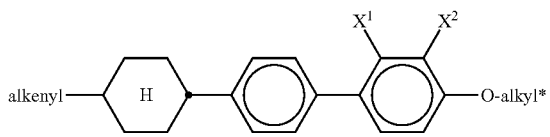
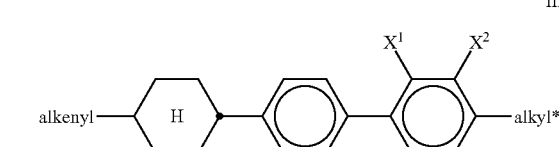
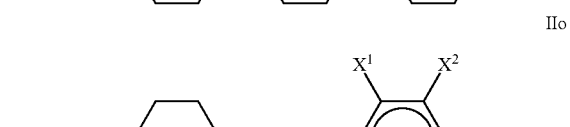
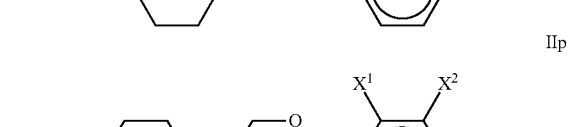
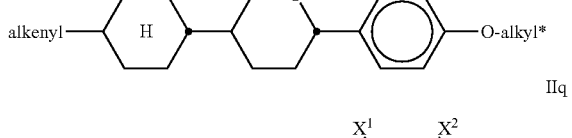
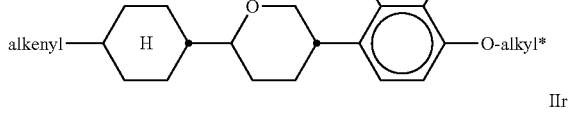
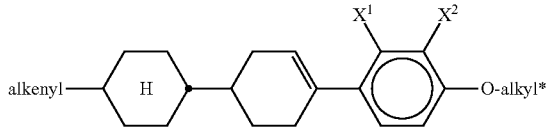

wherein "alkyl" and "alkyl*" denote independently of each other $C_{1-6}$-alkyl. "Alkenyl" denotes straight-chain alkenyl with 2 to 6 carbon atoms, preferably vinyl, $CH_3CH=CH$, $CH_2=CHCH_2CH_2$ and $CH_3CH=CHCH_2CH_2$. Especially preferred LC media contain at least one compound selected from the group of compounds of the formula IIa, IIb, IId, IIf and IIi.

In the compounds of the formula II and the subformulae IIa to IIr $X^1$ and $X^2$ denote preferably F and Cl. Especially preferred are compounds wherein $X^1=X^2=F$ or $X^1=Cl$ and $X^2=F$. In a preferred embodiment is $X^1=X^2=F$.

d) The LC medium additionally contains one or more compounds selected of formula III,

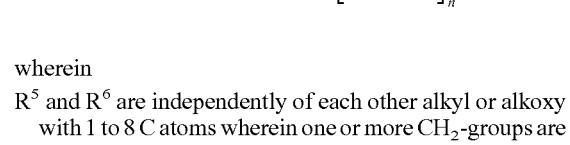

wherein $R^5$ and $R^6$ are independently of each other alkyl or alkoxy with 1 to 8 C atoms wherein one or more $CH_2$-groups are optionally replaced by —CH=CH—, ![B¹ to B³ ring structures]

are independently of each other

![ring options: cyclohexyl (H), phenyl, fluorophenyl, cyclohexenyl, or fluorinated variant]

n is 0 or 1.

The compounds of formula III are selected from the subformulae IIIa to IIIn

IIIa  alkyl—H—H—alkyl*

IIIb  alkyl—H—H—O-alkyl*

IIIc  alkyl—H—phenyl—alkyl*

IIId  alkyl—H—phenyl—O-alkyl*

IIIe  alkyl—H—H—alkenyl

IIIf  alkenyl—H—H—alkenyl*

IIIg  alkyl—H—H—phenyl—alkyl*

IIIh  alkenyl—H—H—phenyl—alkyl*

IIIi  alkyl—phenyl—fluorophenyl—phenyl—alkyl*

IIIj  alkenyl—phenyl—fluorophenyl—phenyl—alkyl

IIIk  alkyl—phenyl—fluorophenyl—phenyl—alkenyl

IIIl  alkyl—H—phenyl—phenyl—alkyl*

IIIm  alkyl—H—cyclohexenyl—phenyl—alkyl*

IIIn  alkyl—H—cyclohexenyl—H—alkyl* in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

The medium according to the invention preferably contains at least one compound of the formula IIIa, formula IIIb, formula IIIe, IIIg, IIIh, and/or IIIi. Especially preferred is the compound of the formula IIIi. Preferred mixtures contain the compound of the formula IIIi in amounts of 5-25% by weight based on the total mixture.

Particularly preferred compounds of the formulae IIIe and IIIf are indicated below:

alkyl—H—H—CH=CH₂ alkyl—H—H—CH₂—CH=CH₂ alkyl—H—H—CH₂—CH₂—CH=CH₂

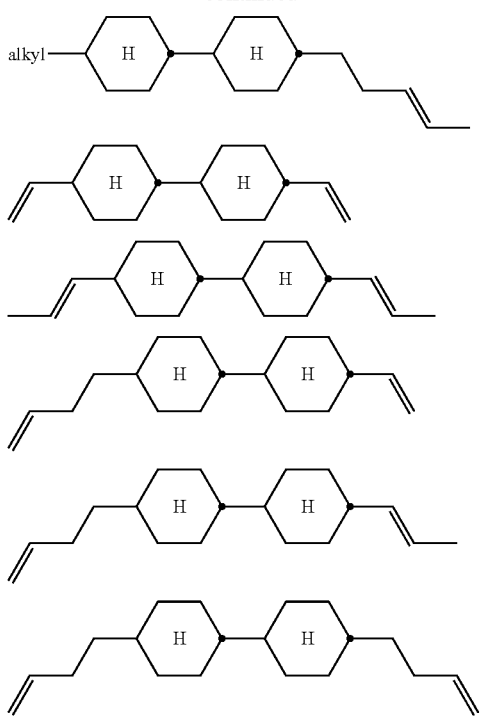

Especially preferred are LC mixtures which contain >30% by weight, most preferred ≥35% by weight of at least one compound of the formula

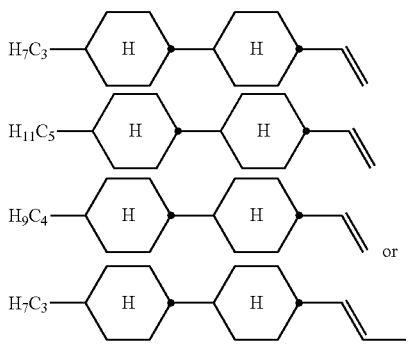

Preferred compounds of the formulae IIIh are indicated below:

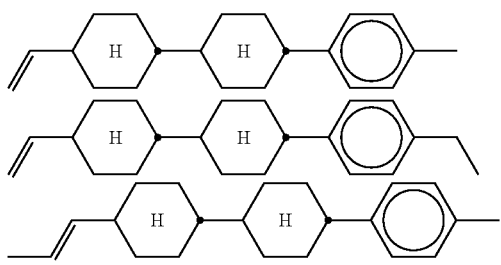

f) Liquid-crystalline medium which additionally contains one or more tetracyclic compounds of the formulae

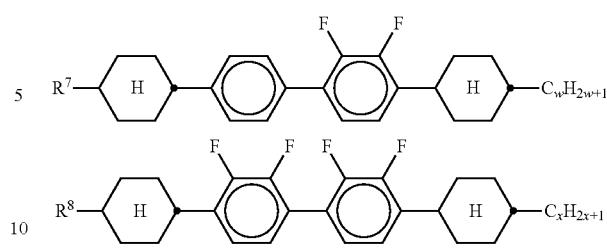

in which
$R^7$ and $R^8$ each, independently of one another, have one of the meaning indicated for $R^1$ in claim 1, and
w and x each, independently of one another, denote 1 to 6.

g) Liquid-crystalline medium which contains one or more compounds of the formulae Z-1 to Z-15

Z-1

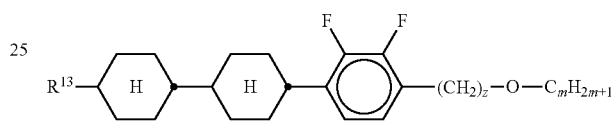

Z-2

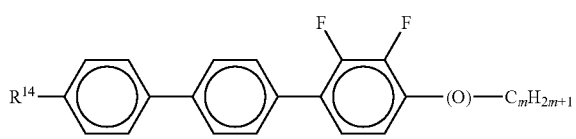

Z-3

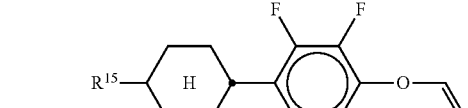

Z-4

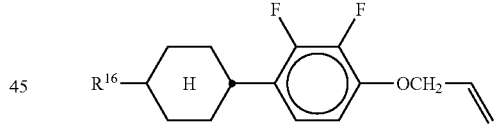

Z-5

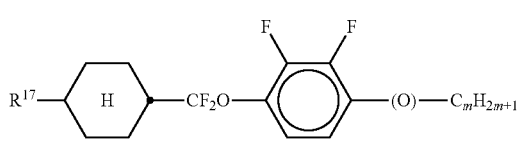

Z-6

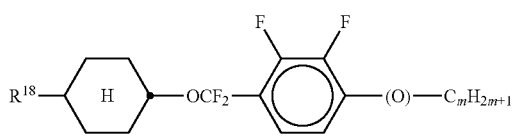

Z-7

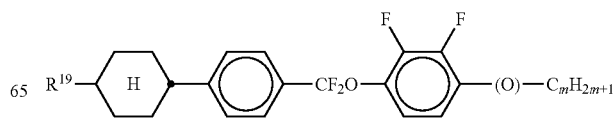

-continued

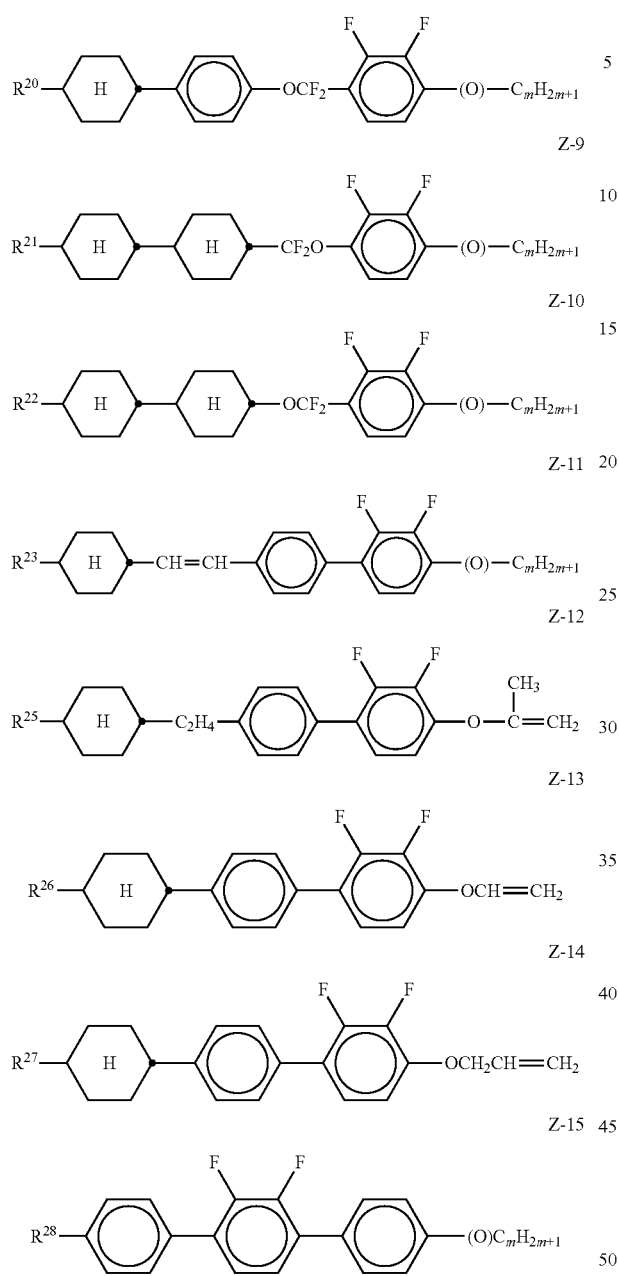

in which $R^{13}$-$R^{28}$ each, independently of one another, have the meanings indicated for $R^1$, and z and m each, independently of one another, denote 1-6. $R^E$ denotes H, $CH_3$, $C_2H_5$ or n-$C_3H_7$.

Especially preferred is the compound of the formula Z-15. Preferred LC mixtures contain 5-25% by weight of the compound of the formula Z-15 based on the total mixture.

h) Liquid-crystalline medium which additionally contains one or more biphenyl or terphenyl compounds of the formulae T-1 and B-1

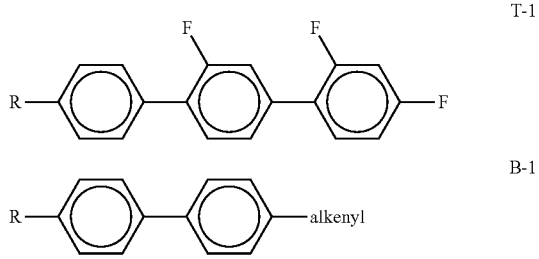

in which R denotes alkyl, alkenyl, alkoxy, alkylalkoxy or alkenyloxy having 1 or 2 to 6 C atoms, and alkenyl has the meaning indicated above.

A preferred compound of the formula B-1 is a compound of the formula B-1a

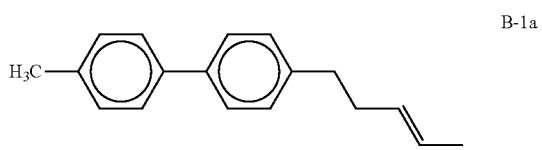

LC mixtures containing 5-25% by weight of at least one compound of the formula T-1 and/or B-1 are preferred.

i) Liquid-crystalline medium which contains at least one compound with a positive delta epsilon ($\Delta\epsilon$) selected from the formulae P-1 to P-6,

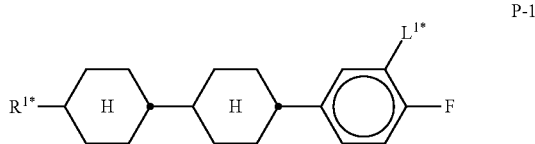

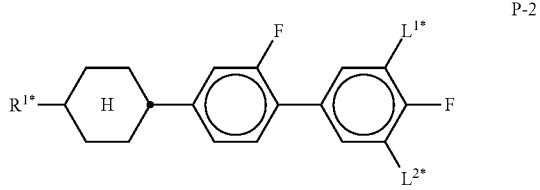

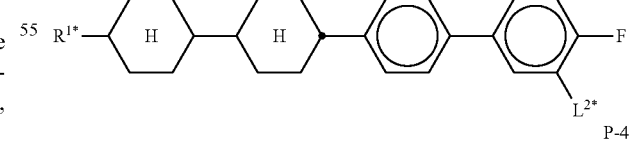

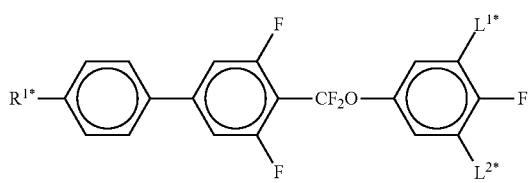

P-5

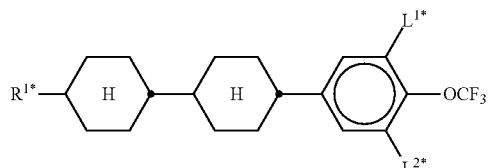

P-6

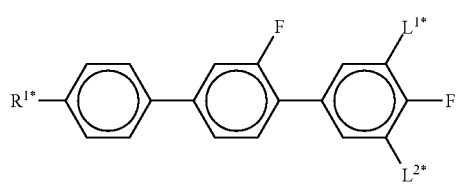

in which R¹* has the meaning of R¹ in Claim 1 and in L¹* and L²* each independently of one another denote H or F.

Particularly preferred media contain one or more compounds selected from the compounds of the formulae P-1 to P-6 wherein L¹* and L²* are both F.

Preferred mixtures according to the present invention contain ≤10% by weight of the compounds of the formulae P-1 to P-6.

j) Particularly preferred media contain one or more compounds of the formula II wherein $X^1=X^2=F$.

k) Liquid-crystalline medium in which the proportion of the compounds of the formula III in the mixture as a whole is from 0 to 50% by weight preferably from 3 to 50% by weight.

l) Liquid-crystalline medium which contains at least one indane compound selected from the formulae In-1 to In-18:

In-1

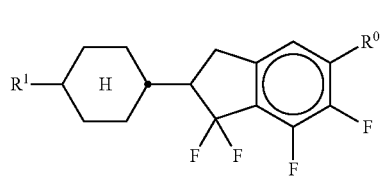

In-2

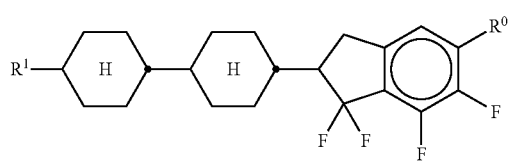

In-3

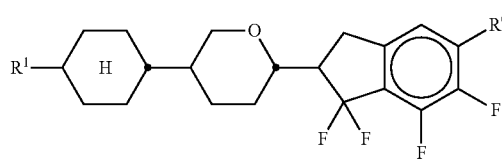

In-4

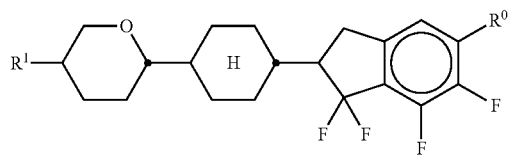

In-5

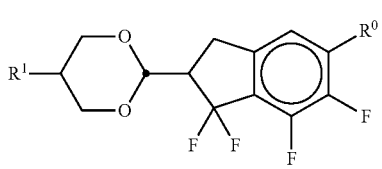

In-6

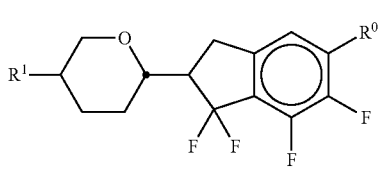

In-7

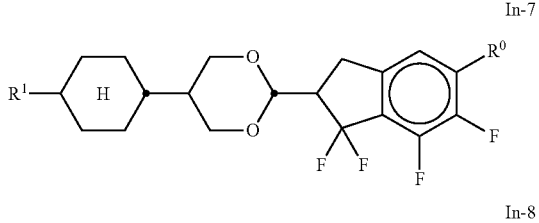

In-8

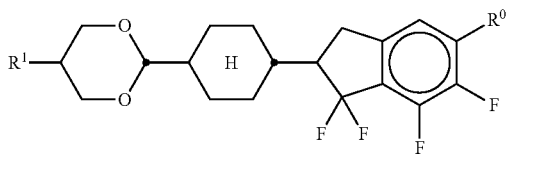

In-9

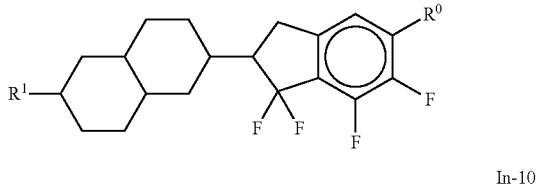

In-10

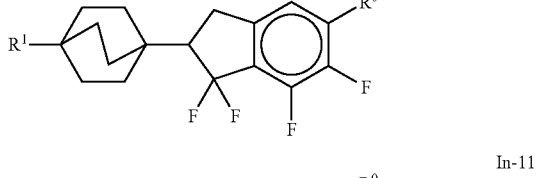

In-11

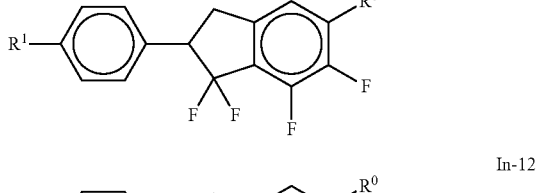

In-12

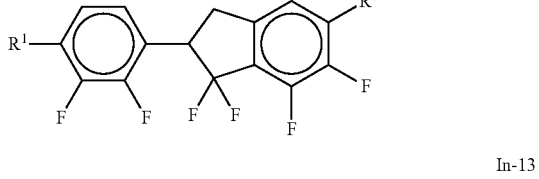

In-13

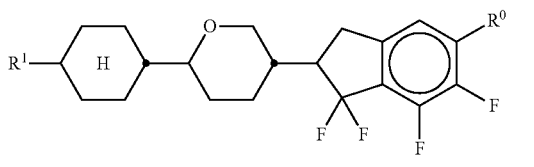

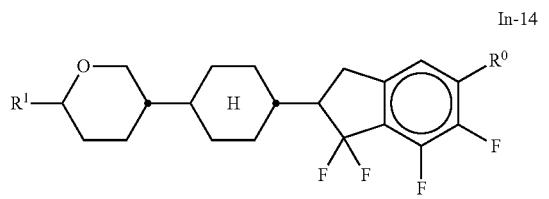
In-14

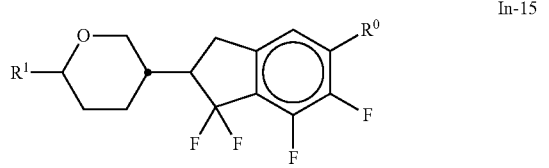
In-15

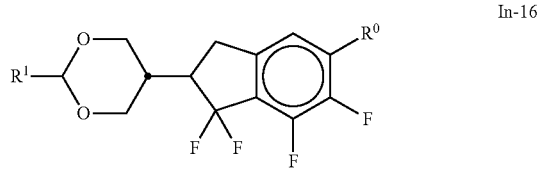
In-16

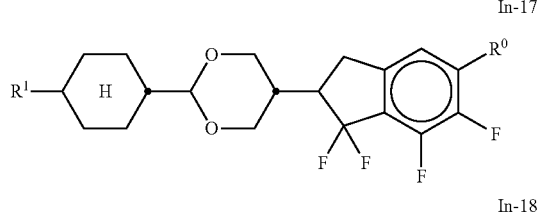
In-17

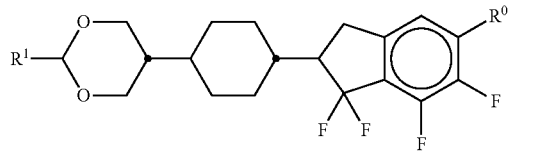
In-18

Preferred LC mixtures contain at least 5-20% by weight of at least one compound of the formula In-1 to In-18.

Particularly preferred media contain one or more compounds selected from the group consisting of the compounds of the formulae:

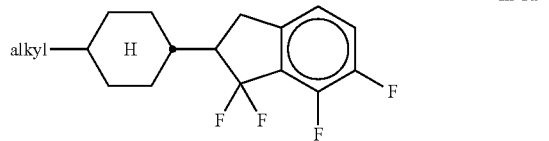
In-1a

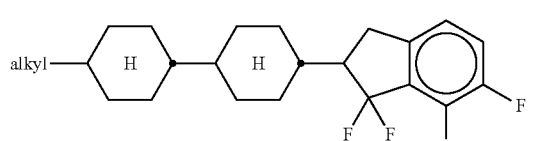
In-2a

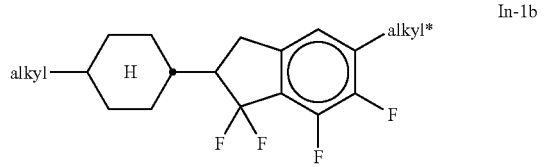
In-1b

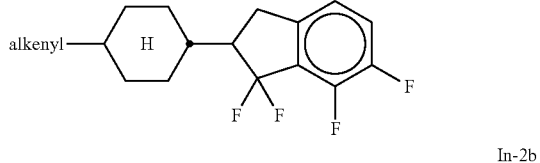
In-1c

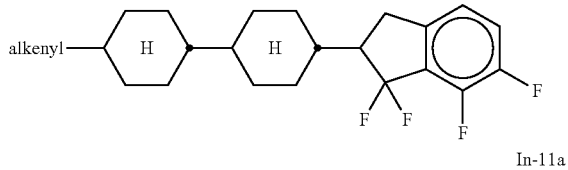
In-2b

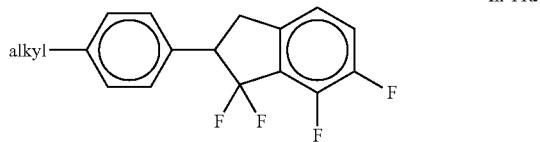
In-11a

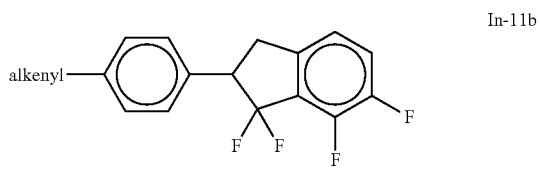
In-11b

Particular preference is given to media which contain at least one compound of the formula In-1a.

m) Liquid-crystalline medium which contains one, two, three, four or more, preferably at least two compounds of the formula II.

n) Liquid-crystalline medium in which $R^1$ and $R^2$ in the formula I preferably have independently of each other the following meanings: straight-chain alkyl, vinyl, 1E-alkenyl or 3-alkenyl.

If $R^1$ denotes alkenyl, it is preferably $CH_2=CH$, $CH_3-CH=CH$, $C_3H_7-CH=CH$, $CH_2=CH-C_2H_4$ or $CH_3-CH=CH-C_2H_4$.

o) Liquid-crystalline medium in which the proportion of compounds of the formula I in the mixture as a whole is 1 to 30% by weight, preferably at least 5% by weight, most preferably 5 to 15% by weight, based on the total mixture.

p) Liquid-crystalline medium in which the proportion of compounds of the formula II in the mixture as a whole is at least 30% by weight, preferably at least 40%.

q) Preferred liquid-crystalline media according to the invention contain one or more substances with a tetrahydronaphthyl or naphthyl unit, such as, for example, the compounds of the formulae N-1 to N-5.

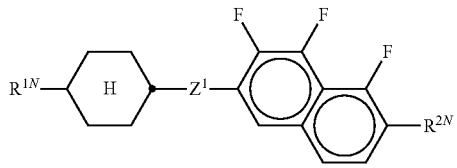
N-1

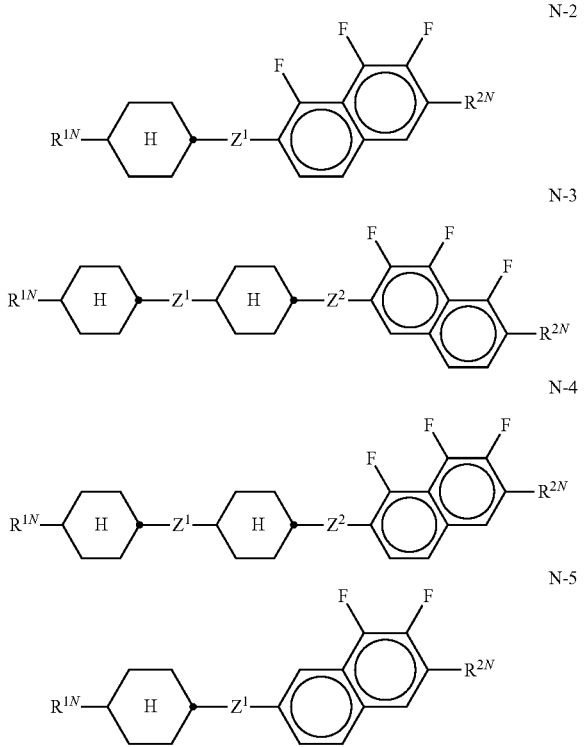

in which $R^{1N}$ and $R^{2N}$ each, independently of one another, have the meaning of $R^1$ in claim 1.

r) Preferred mixture concepts are given in the following.

LC mixture contains
- at least one compound of the formula I, preferably at least one compound of the formula Ia, and
- at least one compound of the formula II and
- at least one compound of the formula T-1.

LC mixture contains
- at least one compound of the formula I, preferably at least one compound of the formula Ia, and
- at least one compound of the formula II, and
- at least one compound of the formula B-1.

LC mixture contains
- at least one compound of the formula I, preferably at least one compound of the formula Ia, and
- at least one compound of the formula II, and
- at least one compound of the formula Z-15.

LC mixture contains
- at least one compound of the formula I, preferably at least one compound of the formula Ia, and
- at least one compound of the formula II, and
- at least one compound of the formula In-1 to In-18.

LC mixture contains
- at least one compound of the formula I, preferably at least one compound of the formula Ia, and
- at least one compound of the formula IIj, IIk and/or Ill.

LC mixture contains
- at least one compound of the formula I, preferably at least one compound of the formula Ia, and
- at least one compound of the formula IIr.

LC mixture contains at least one compound of the formula with the acronym CCOC-n-m listed in the following table.

LC mixture contains at least one compound of the formula with the acronym CCPC-nmr listed in the following table.

LC mixture contains at least one compound of the formula with the acronym CH-nmr listed in the following table.

The invention furthermore relates to an electro-optical display with active-matrix addressing based on the ECB effect, characterised in that it contains, as dielectric, a liquid-crystalline medium according to one of Claims 1 to 9.

The liquid-crystalline medium preferably has a nematic phase range of at least 60 K and a flow viscosity $v_{20}$ of at most 30 mm$^2 \cdot$s$^{-1}$ at 20° C.

The liquid-crystalline mixture according to the invention has a $\Delta\in$ of about −0.5 to −8.0, in particular about −3.0 to −6.0, where $\Delta\in$ denotes the dielectric anisotropy. The rotational viscosity $\gamma_1$ is preferably <150 mPa·s, in particular <140 mPa·s.

The birefringence Δn in the liquid-crystal mixture is generally from 0.07 to 0.18, preferably from 0.08 to 0.16, most preferably from 0.08 to 0.13.

The mixtures according to the invention are suitable for all VA-TFT applications, such as, for example, MVA, PVA, ASV and PS-VA. They are furthermore suitable for IPS, FFS and PALC applications with negative $\Delta\in$.

The individual components of the formulae I, II and III of the liquid-crystal phases according to the invention are either known or their methods of preparation can easily be derived from the prior art by the person skilled in the relevant art since they are based on standard methods described in the literature.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≤−0.3. It preferably comprises compounds of the formulae II.

The proportion of component A is preferably between 30 and 99%, in particular between 40 and 90%.

For component A, one (or more) individual compound(s) which has (have) a value of $\Delta\in$ of ≤−0.8 is (are) preferably selected. This value must be more negative the smaller the proportion A in the mixture as a whole.

Component B has pronounced nematogeneity and a flow viscosity of not greater than 30 mm$^2 \cdot$s$^{-1}$, preferably not greater than 25 mm$^2 \cdot$s$^{-1}$, at 20° C.

Particularly preferred individual compounds in component B are extremely low-viscosity nematic liquid crystals having a flow viscosity of not greater than 18 mm$^2 \cdot$s$^{-1}$, preferably not greater than 12 mm$^2 \cdot$s$^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formulae I, II and III.

In addition, these liquid-crystal phases may also comprise more than 18 components, preferably 18 to 25 components.

The phases preferably comprise 4 to 15, in particular 5 to 12, compounds of the formulae I, II and optionally III.

Besides compounds of the formulae I, II and III, other constituents may also be present, for example in an amount of up to 45% of the mixture as a whole, but preferably up to 35%, in particular up to 10%.

The other constituents are preferably selected from nematic or nemato-genic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexyl-pyrimidines, phenyl- or cyclohexyldioxanes, optionally halogenated stilbenes, benzyl phenyl ethers, tolans and substituted cinnamic acids.

The most important compounds which are suitable as constituents of liquid-crystal phases of this type can be characterised by the formula IV $$R^9\text{-L-G-E-}R^{10} \quad\quad IV$$

in which L and E each denote a carbocyclic or heterocyclic ring system from the group formed by 1,4-disubstituted benzene and cyclohexane rings, 4,4'-disubstituted biphenyl, phenylcyclohexane and cyclohexylcyclo-hexane systems, 2,5-disubstituted pyrimidine and 1,3-dioxane rings, 2,6-disubstituted naphthalene, di- and tetrahydronaphthalene, quinazoline and tetrahydroquinazoline, G is —CH=CH— —N(O)=N—
—CH—CQ- —CH=N(O)—
—C≡C— —CH$_2$—CH$_2$—
—CO—O— —CH$_2$—O—
—CO—S— —CH$_2$—S—
—CH=N— —COO-Phe-COO—
—CF$_2$O— —CF=CF—
—OCF$_2$ —OCH$_2$—
—(CH$_2$)$_4$— —(CH$_2$)$_3$O— or a C—C single bond, Q denotes halogen, preferably chlorine, or —CN, and $R^9$ and $R^{19}$ each denote alkyl, alkenyl, alkoxy, alkanoyloxy or alkoxycar-bonyloxy having up to 18, preferably up to 8 carbon atoms, or one of these radicals alternatively denotes CN, NC, NO$_2$, NCS, CF$_3$, OCF$_3$, F, Cl or Br.

In most of these compounds, $R^9$ and $R^{19}$ are different from one another, one of these radicals usually being an alkyl or alkoxy group. Other variants of the proposed substituents are common. Many such substances or also mixtures thereof are also commercially available. All these substances can be prepared by methods known from the literature.

It goes without saying for the person skilled in the art that the VA, IPS or PALC mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP-A 0 240 379.

The following examples are intended to explain the invention without limiting it. Above and below, percentages are percent by weight based on the total mixture; all temperatures are indicated in degrees Celsius.

Besides the compounds of the formulae I and II, the mixtures according to the invention preferably comprise one or more of the compounds shown below.

The following abbreviations are used:
(n and m=1-6; z=1-6; m(O)m denotes n-m or n-Om)

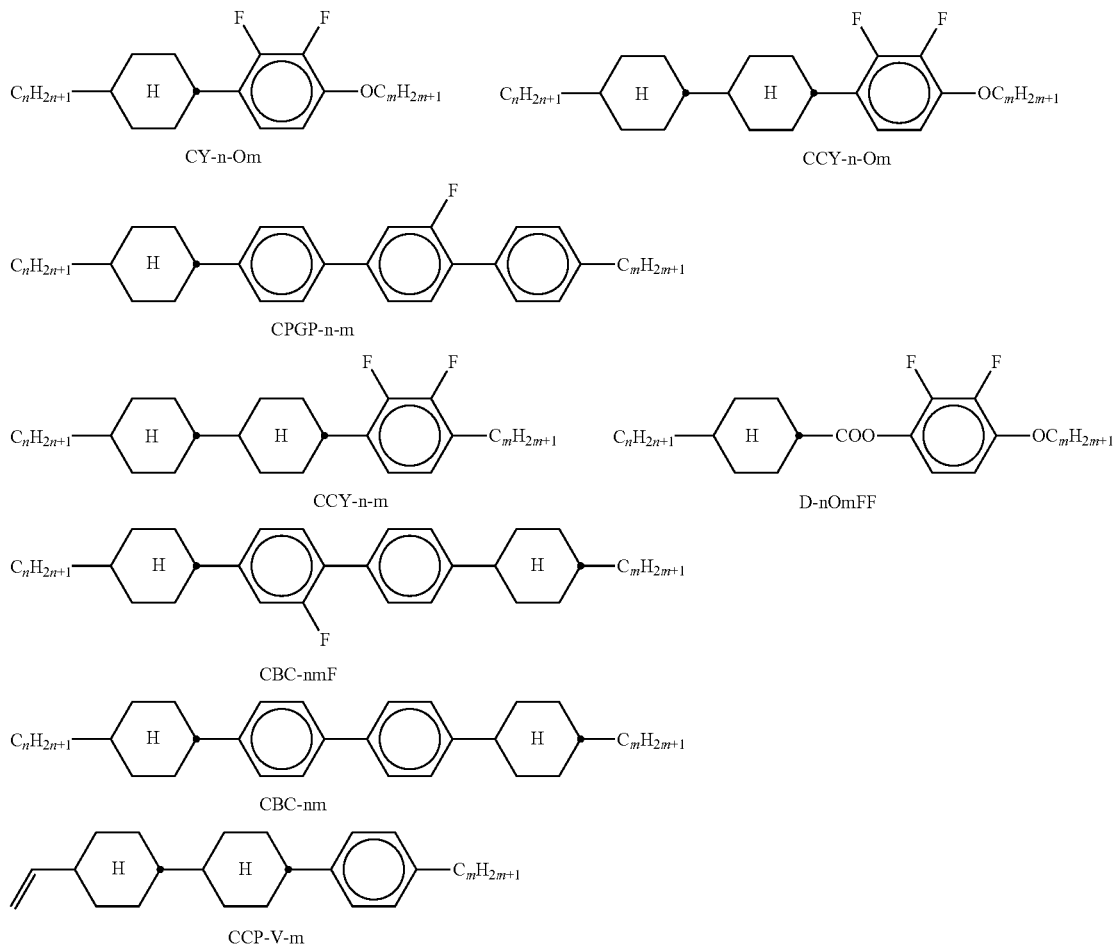

-continued
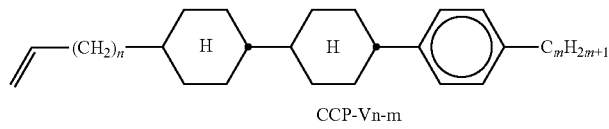
CCP-Vn-m
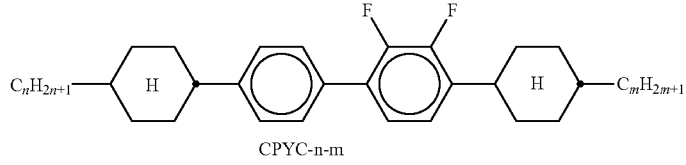
CPYC-n-m
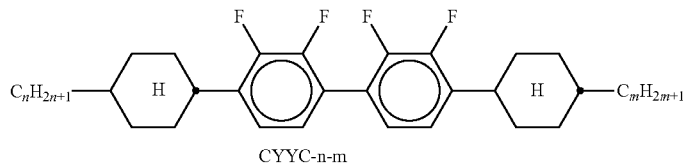
CYYC-n-m
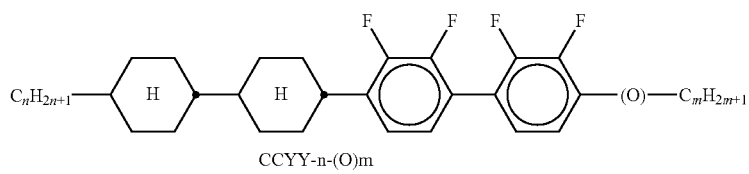
CCYY-n-(O)m
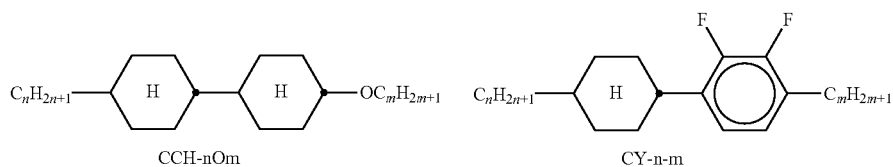
CCH-nOm     CY-n-m
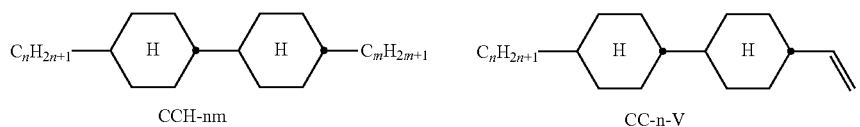
CCH-nm     CC-n-V
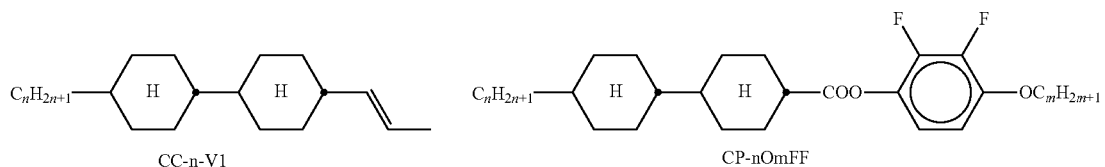
CC-n-V1     CP-nOmFF
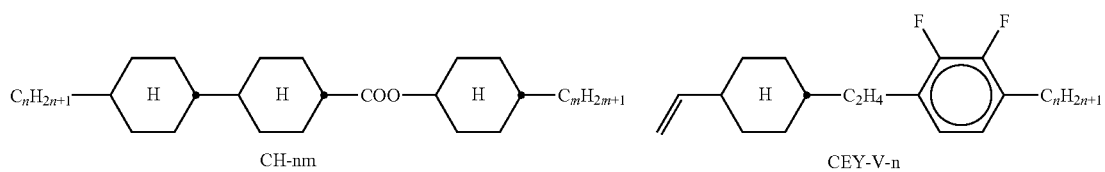
CH-nm     CEY-V-n
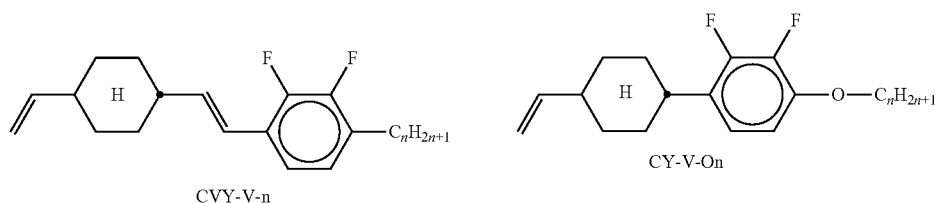
CVY-V-n     CY-V-On
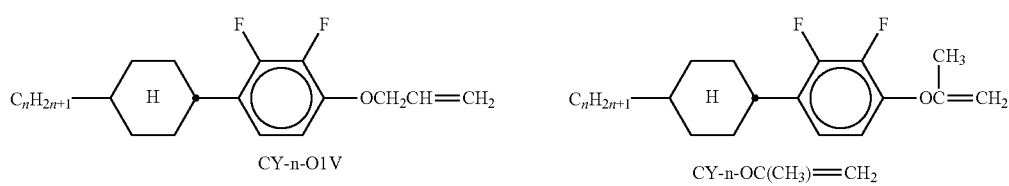
CY-n-O1V     CY-n-OC(CH$_3$)=CH$_2$ -continued
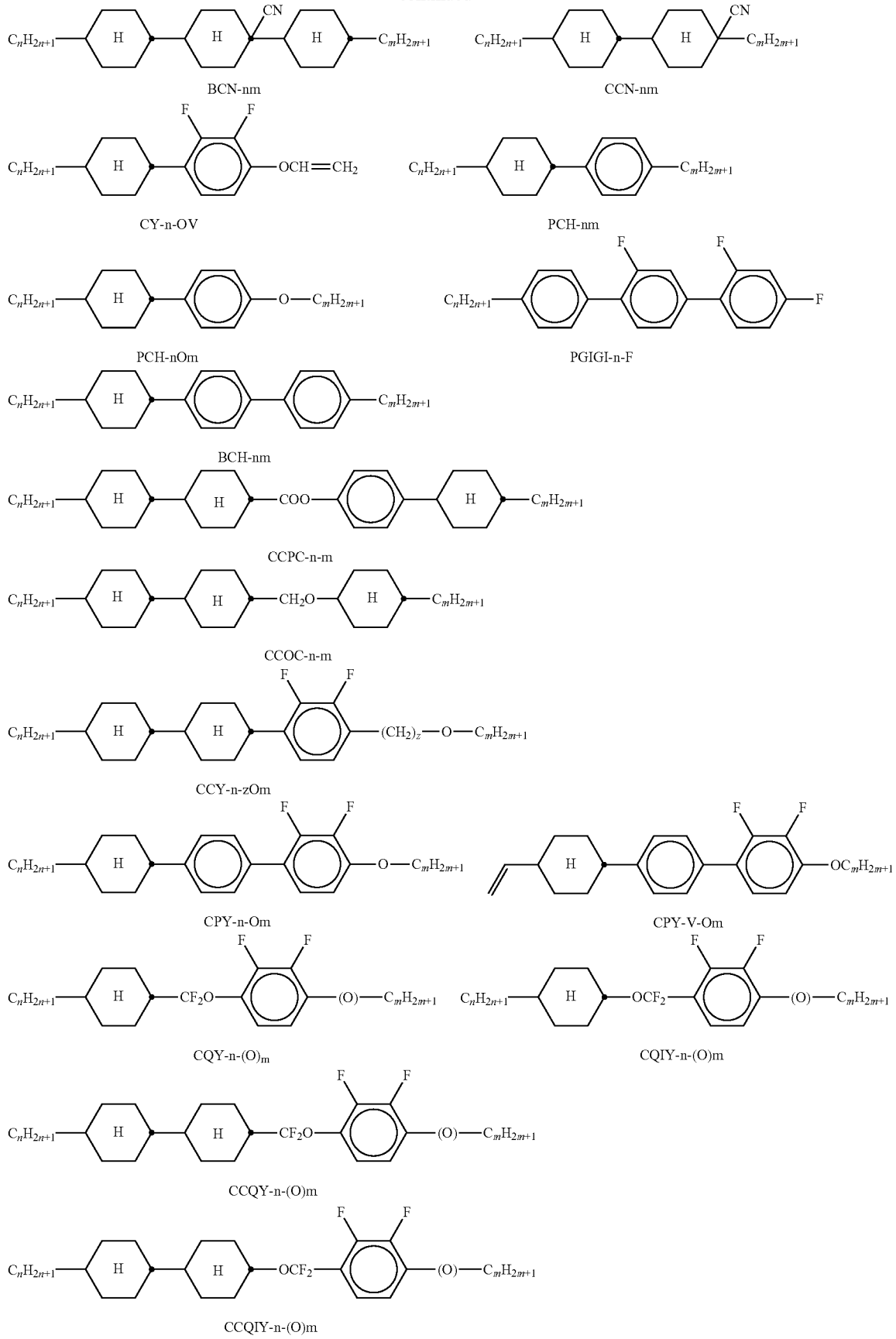

-continued
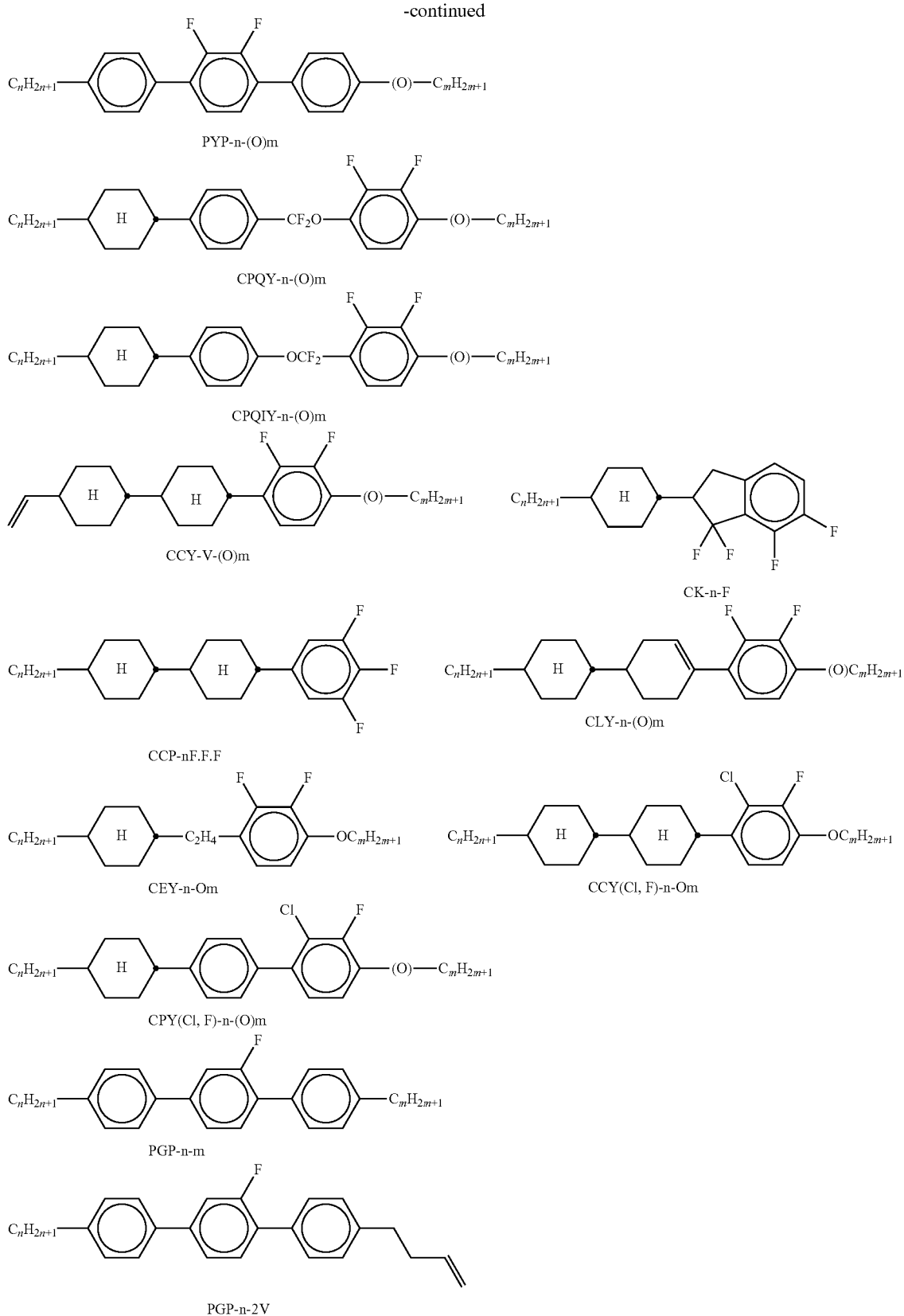
The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after mixing.

The dielectrics may also comprise further additives known to the person skilled in the art and described in the literature, such as, for example, UV absorbers, nanoparticles, nanobeeds, microparticles, antioxidants and free-radical scavengers. For example, 0-15% of pleochroic dyes, stabilisers or chiral dopants may be added.

For example, 0-15% of pleochroic dyes may be added, furthermore conductive salts, preferably ethyldimethyldodecylammonium 4-hexoxy-benzoate, tetrabutylammonium tetraphenylboranate or complex salts of crown ethers (cf., for example, Haller et al., Mol. Cryst. Liq. Cryst. Volume 24, pages 249-258 (1973)) in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table A shows for example possible dopants which can be added to the mixtures according to the invention. If the mixtures according to the invention comprise a dopant, it is generally added in amounts of 0.01 to 4.0% by weight, preferably 0.1 to 1.0% by weight.

TABLE A

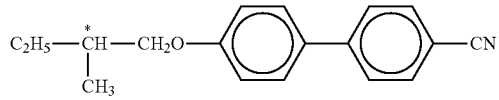

C 15

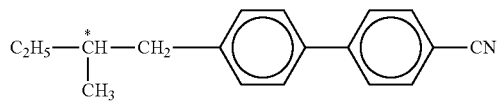

CB 15

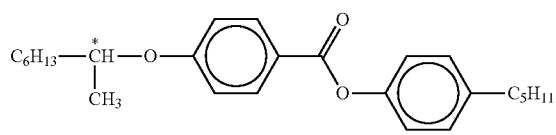

CM 21

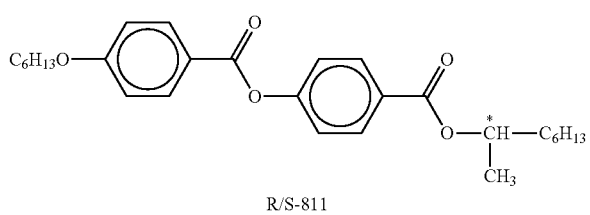

R/S-811

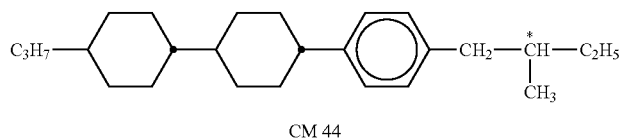

CM 44

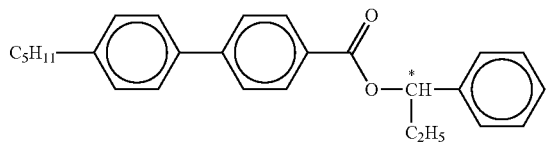

CM 45

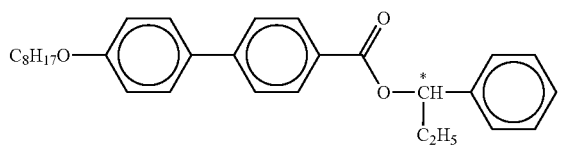

CM 47

TABLE A-continued
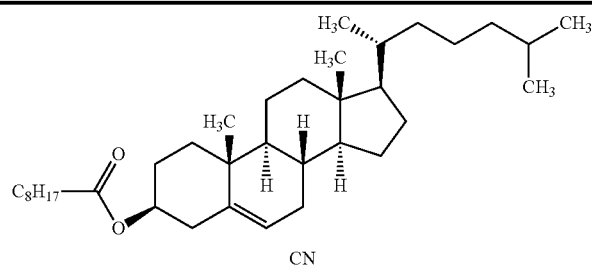
CN
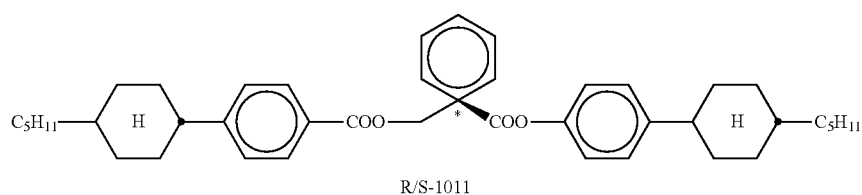
R/S-1011
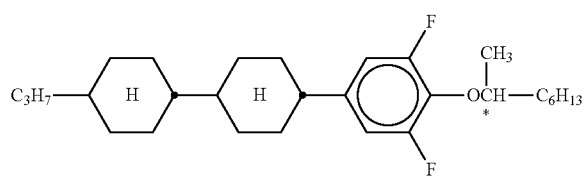
R/S-2011
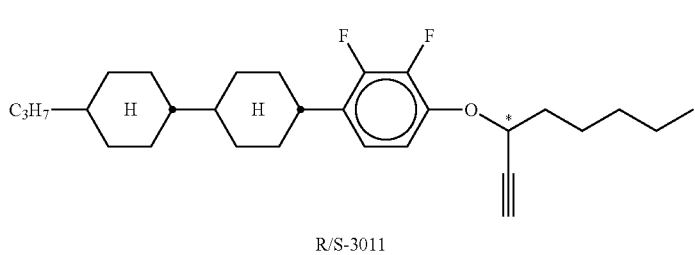
R/S-3011
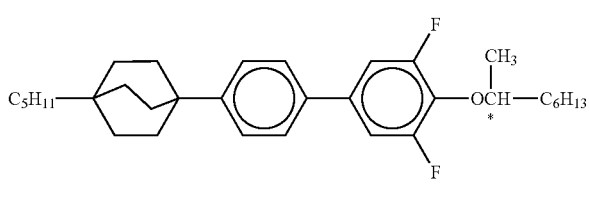
R/S-4011
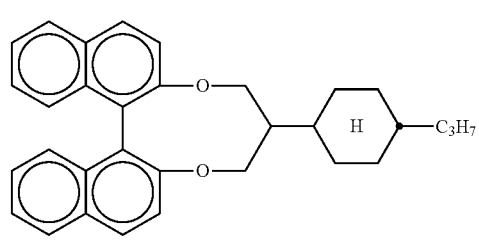
R/S-5011

Stabilisers which can be added, for example, to the mixtures according to the invention are shown below in Table B.
TABLE B
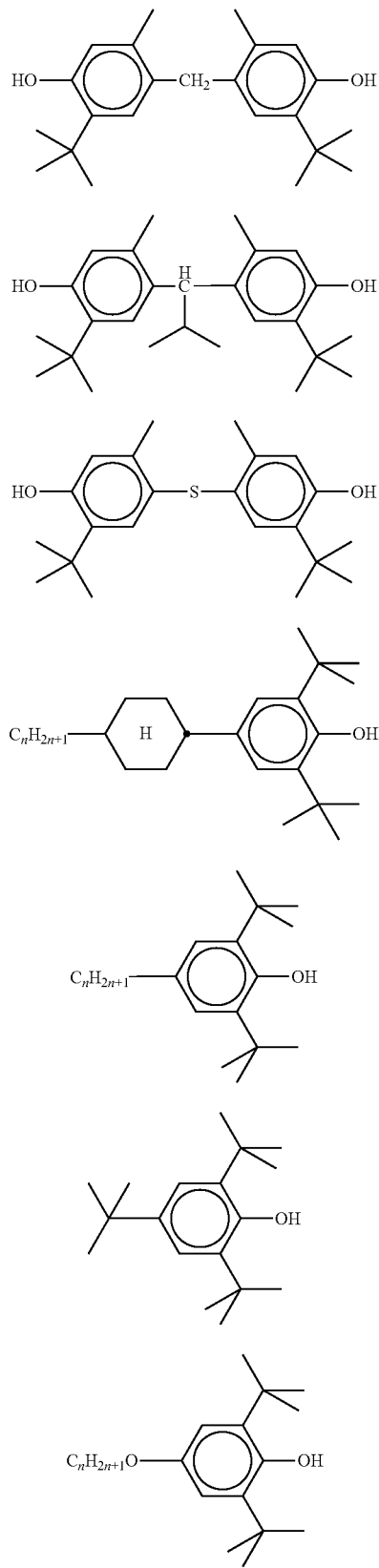

TABLE B-continued
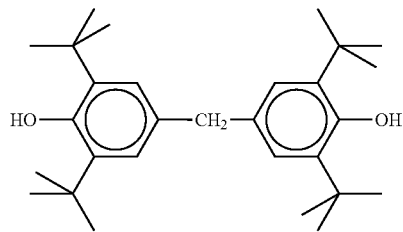
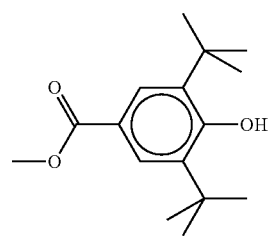
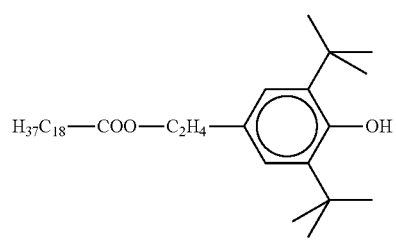
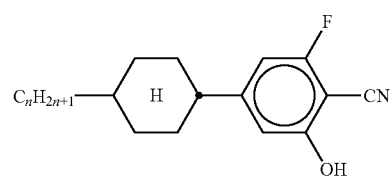
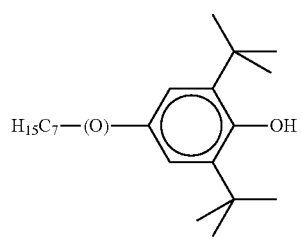
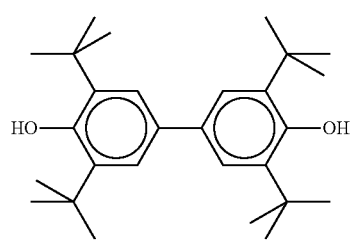

TABLE B-continued
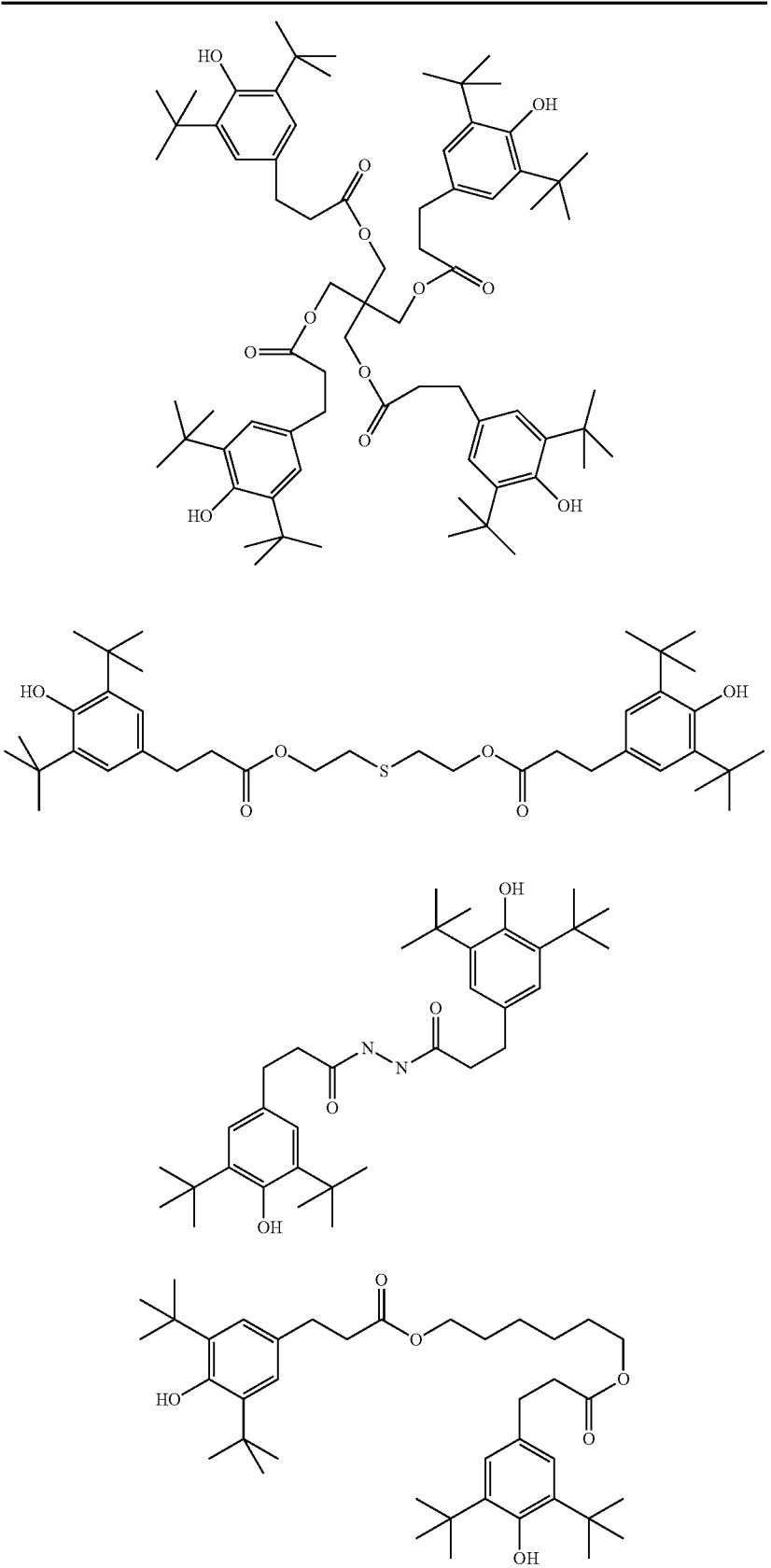

TABLE B-continued
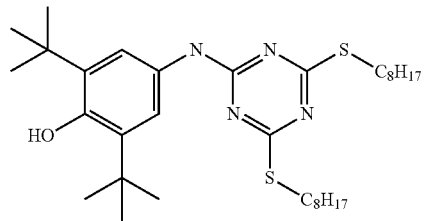
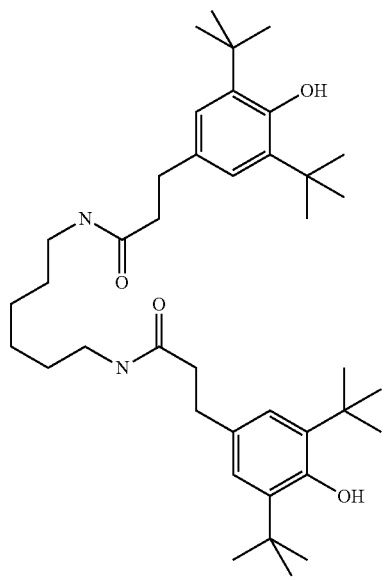 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
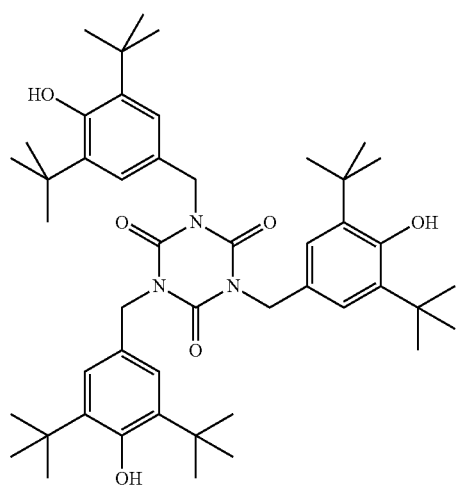 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
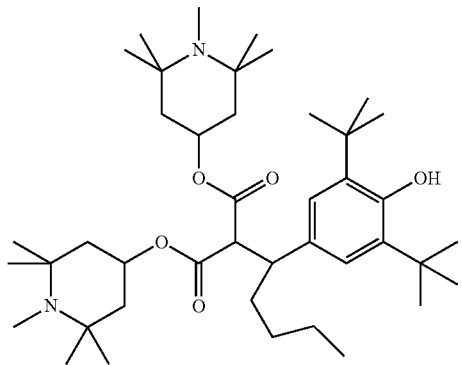 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE B-continued
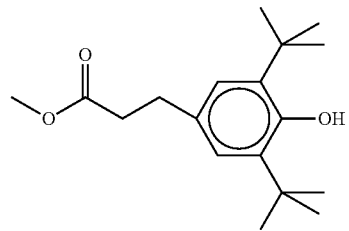
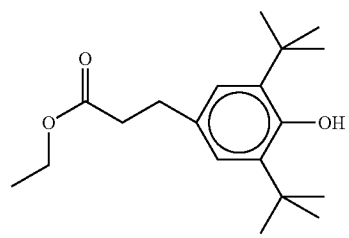
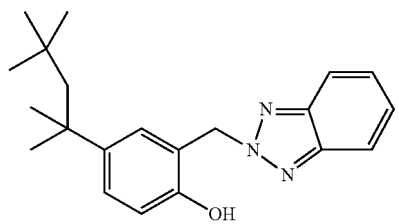 [SMILES: CC(C)(C)CC(C)(C)c1ccc(O)c(Cn2nc3ccccc3n2)c1]
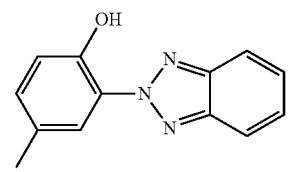 [SMILES: Cc1ccc(O)c(-n2nc3ccccc3n2)c1]
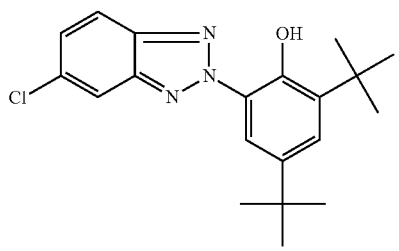 [SMILES: CC(C)(C)c1cc(-n2nc3ccc(Cl)cc3n2)c(O)c(C(C)(C)C)c1]
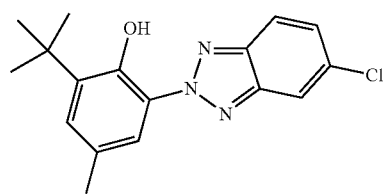 [SMILES: Cc1cc(-n2nc3ccc(Cl)cc3n2)c(O)c(C(C)(C)C)c1]

TABLE B-continued
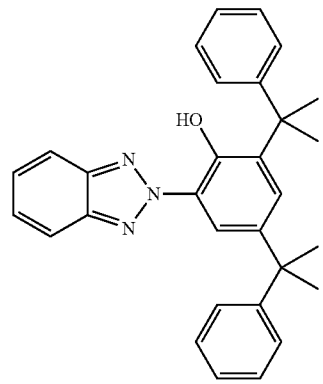 [SMILES: CC(C)(c1ccccc1)c1cc(-n2nc3ccccc3n2)c(O)c(C(C)(C)c2ccccc2)c1]
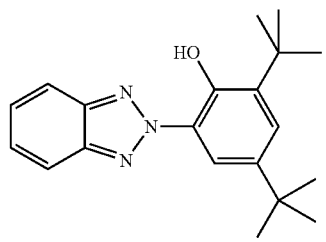 [SMILES: CC(C)(C)c1cc(-n2nc3ccccc3n2)c(O)c(C(C)(C)C)c1]
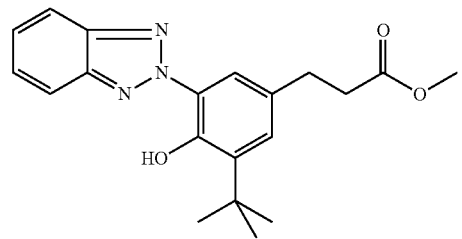 [SMILES: COC(=O)CCc1cc(-n2nc3ccccc3n2)c(O)c(C(C)(C)C)c1]
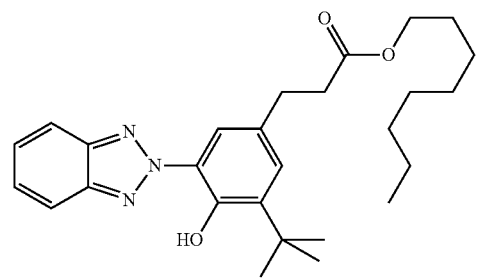 [SMILES: CCCCCCCCOC(=O)CCc1cc(-n2nc3ccccc3n2)c(O)c(C(C)(C)C)c1]

TABLE B-continued
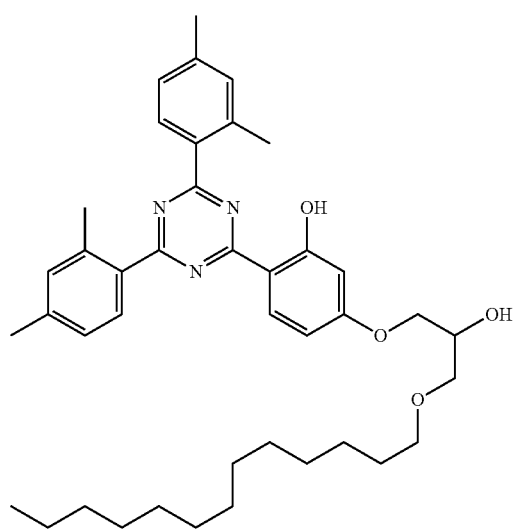 [SMILES: CCCCCCCCCCCCCOCC(O)COc1ccc(-c2nc(-c3ccc(C)cc3C)nc(-c3ccc(C)cc3C)n2)c(O)c1]
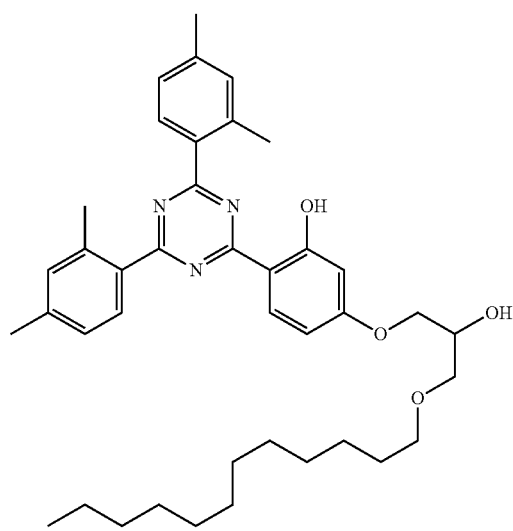 [SMILES: CCCCCCCCCCCCOCC(O)COc1ccc(-c2nc(-c3ccc(C)cc3C)nc(-c3ccc(C)cc3C)n2)c(O)c1]
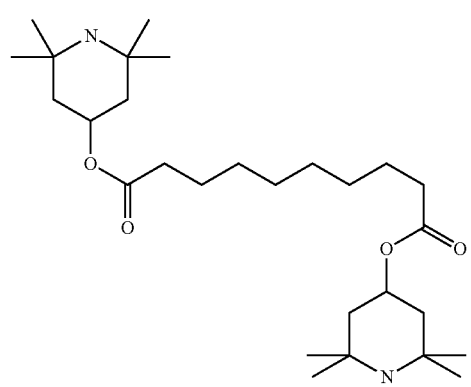

TABLE B-continued

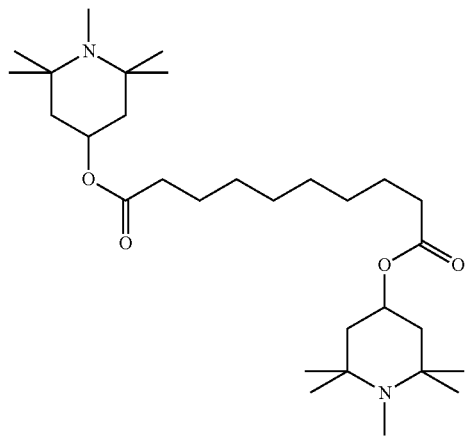

(n = 1-12)

The following examples are intended to explain the invention without limiting it. Above and below, $V_o$ denotes the threshold voltage, capacitive [V] at 20° C.

Δn denotes the optical anisotropy measured at 20° C. and 589 nm

Δε denotes the dielectric anisotropy at 20° C. and 1 kHz cp. denotes the clearing point [° C.]

$\gamma_1$ denotes the rotational viscosity measured at 20° C. [mPa·s]

LTS denotes the low temperature stability, determined in test cells

For the purposes of the present invention, all concentrations are, unless explicitly stated otherwise, indicated in percent by weight and relate to the corresponding mixture or mixture component. All physical properties are and have been determined in accordance with "Merck Liquid Crystals, Physical Properties of Liquid Crystals", Status November 1997, Merck KGaA, Germany, and apply to a temperature of 20° C., unless explicitly stated otherwise. The rotational viscosity is determined by the rotating permanent magnet method and the flow viscosity in a modified Ubbelohde viscometer.

The display used for measurement of the threshold voltage has two plane-parallel outer plates at a separation of 20 μm and electrode layers with overlying alignment layers of SE-1211 (Nissan Chemicals) on the insides of the outer plates, which effect a homeotropic alignment of the liquid crystals.

The following examples are intended to explain the invention without restricting it.

MIXTURE EXAMPLES

Example 1

| A liquid crystal mixture containing | | | |
|---|---|---|---|
| CY-3-O4 | 32.00% | cp. [° C.]: | 100.8 |
| CY-5-O2 | 6.00% | Δn [589 nm, 20° C.]: | 0.1504 |
| CCY-3-O2 | 7.00% | | |
| CCY-4-O2 | 7.00% | | |
| CCY-3-O3 | 2.00% | | |
| CCY-3-1 | 4.00% | | |
| PYP-2-3 | 10.00% | | |
| PYP-2-4 | 10.00% | | |
| BCH-32 | 7.00% | | |
| CPGP-5-3 | 6.00% | | |
| CPGP-5-2 | 6.00% | | |
| CPGP-4-3 | 3.00% | | |

Example 2

| A liquid crystal mixture containing | | | |
|---|---|---|---|
| CY-3-O4 | 32.00% | cp. [° C.]: | 101.5 |
| CY-5-O2 | 6.00% | Δn [589 nm, 20° C.]: | 0.150 |
| CCY-3-O2 | 7.00% | Δε [1 kHz, 20° C.]: | −4.0 |
| CCY-1-O2 | 7.00% | $K_1$ [20° C.]: | 15.1 |
| CCY-3-O3 | 4.00% | $K_3$ [20° C.]: | 17.0 |
| PYP-2-3 | 10.00% | $K_3/K_1$ [20° C.]: | 1.13 |
| PYP-2-4 | 10.00% | $V_0$ [20° C.]: | 2.17 V |
| BCH-32 | 7.00% | | |
| CPGP-5-3 | 6.00% | | |
| CPGP-5-2 | 6.00% | | |
| CPGP-1-3 | 3.00% | | |
| CCP-V-1 | 2.00% | | |

Example 3

| A liquid crystal mixture containing | | | |
|---|---|---|---|
| CY-3-O4 | 30.00% | cp. [° C.]: | 98.4 |
| CY-5-O2 | 4.00% | Δn [589 nm, 20° C.]: | 0.1631 |
| CCY-3-O2 | 5.00% | Δε [1 kHz, 20° C.]: | −4.0 |
| CCY-4-O2 | 8.00% | $K_1$ [20° C.]: | 15.3 |
| CCY-3-O3 | 8.00% | $K_3$ [20° C.]: | 17.2 |
| PYP-2-3 | 10.00% | $K_3/K_1$ [20° C.]: | 1.12 |
| PYP-2-4 | 10.00% | $V_0$ [20° C.]: | 2.19 V |
| PGP-2-3 | 14.00% | | |
| CPGP-5-3 | 10.00% | | |

Example 4

| A liquid crystal mixture containing | | | |
|---|---|---|---|
| CY-3-O4 | 19.00% | cp. [° C.]: | 113 |
| CY-5-O4 | 18.00% | $\Delta n$ [589 nm, 20° C.]: | 0.1072 |
| CCY-3-O2 | 6.00% | $\Delta \epsilon$ [1 kHz, 20° C.]: | −5.6 |
| CCY-3-O3 | 6.00% | | |
| CCY-4-O2 | 6.00% | | |
| CCY-5-O2 | 6.00% | | |
| CPY-2-O2 | 9.00% | | |
| CPY-3-O2 | 9.00% | | |
| CH-43 | 3.00% | | |
| CH-45 | 3.00% | | |
| CCOC-3-3 | 2.00% | | |
| CCOC-4-3 | 2.00% | | |
| CCOC-3-5 | 2.00% | | |
| CCPC-33 | 3.00% | | |
| CCPC-34 | 3.00% | | |
| CPGP-5-3 | 3.00% | | |

Example 5

| A liquid crystal mixture containing | | | |
|---|---|---|---|
| CY-3-O4 | 26.00% | cp. [° C.]: | 85.9 |
| CY-3-O2 | 10.00% | $\Delta n$ [589 nm, 20° C.]: | 0.1117 |
| CCY-3-O2 | 7.00% | $\Delta \epsilon$ [1 kHz, 20° C.]: | −4.7 |
| CCY-3-O3 | 7.00% | $K_1$ [20° C.]: | 14.7 |
| CCY-4-O2 | 6.00% | $K_3$ [20° C.]: | 16.4 |
| CCY-5-O2 | 6.00% | $K_3/K_1$ [20° C.]: | 1.11 |
| CCY-2-1 | 9.00% | $V_0$ [20° C.]: | 1.98 V |
| CCY-3-1 | 8.00% | | |
| PGP-2-3 | 10.00% | | |
| CPGP-5-2 | 3.00% | | |
| CC-3-V1 | 8.00% | | |

Example 6

| A liquid crystal mixture containing | | | |
|---|---|---|---|
| CY-3-O4 | 28.00% | cp. [° C.]: | 85.2 |
| CCY-3-O2 | 7.00% | $\Delta n$ [589 nm, 20° C.]: | 0.1134 |
| CCY-3-O3 | 6.00% | $\Delta \epsilon$ [1 kHz, 20° C.]: | −4.8 |
| CCY-4-O2 | 6.00% | $K_1$ [20° C.]: | 14.3 |
| CCY-5-O2 | 6.00% | $K_3$ [20° C.]: | 14.3 |
| CCY-3-1 | 8.00% | $K_3/K_1$ [20° C.]: | 1.00 |
| PGP-2-3 | 13.00% | $V_0$ [20° C.]: | 1.84 V |
| CPGP-5-2 | 4.00% | | |
| CC-4-V | 10.00% | | |
| CK-3-F | 4.00% | | |
| CK-4-F | 4.00% | | |
| CK-5-F | 4.00% | | |

Example 7

| A liquid crystal mixture containing | | | |
|---|---|---|---|
| CY-3-O4 | 28.00% | cp. [° C.]: | 83.3 |
| CY-5-O4 | 15.00% | $\Delta n$ [589 nm, 20° C.]: | 0.1107 |
| CCY-3-O2 | 8.00% | $\Delta \epsilon$ [1 kHz, 20° C.]: | −4.0 |
| CCY-3-O3 | 8.00% | $K_1$ [20° C.]: | 12.6 |
| CCY-4-O2 | 8.00% | $K_3$ [20° C.]: | 14.3 |
| CPGP-5-2 | 7.00% | $K_3/K_1$ [20° C.]: | 1.14 |
| CPGP-5-3 | 6.00% | $V_0$ [20° C.]: | 2.00 V |
| CC-4-V | 14.00% | | |
| PGP-2-3 | 6.00% | | |

Example 8

| A liquid crystal mixture containing | | | |
|---|---|---|---|
| CY-3-O4 | 25.00% | cp. [° C.]: | 87.5 |
| CCY-3-O2 | 7.00% | $\Delta n$ [589 nm, 20° C.]: | 0.1121 |
| CCY-3-O3 | 7.00% | $\Delta \epsilon$ [1 kHz, 20° C.]: | −4.0 |
| CCY-4-O2 | 7.00% | $K_1$ [20° C.]: | 13.1 |
| CCY-3-1 | 7.00% | $K_3$ [20° C.]: | 14.5 |
| PGP-2-3 | 11.00% | $K_3/K_1$ [20° C.]: | 1.11 |
| CPGP-5-2 | 8.00% | $V_0$ [20° C.]: | 2.00 V |
| CC-4-V | 16.00% | | |
| CK-3-F | 4.00% | | |
| CK-4-F | 4.00% | | |
| CK-5-F | 4.00% | | |

Example 9

| A liquid crystal mixture containing | | | |
|---|---|---|---|
| CY-3-O4 | 21.00% | cp. [° C.]: | 87.6 |
| CY-5-O4 | 13.00% | $\Delta n$ [589 nm, 20° C.]: | 0.1088 |
| CCY-3-O2 | 7.00% | $\Delta \epsilon$ [1 kHz, 20° C.]: | −4.9 |
| CCY-3-O3 | 7.00% | $K_1$ [20° C.]: | 15.3 |
| CCY-4-O2 | 6.00% | $K_3$ [20° C.]: | 16.1 |
| CPY-3-O2 | 11.00% | $K_3/K_1$ [20° C.]: | 1.05 |
| CCY-2-1 | 7.00% | $V_0$ [20° C.]: | 1.93 V |
| CCY-3-1 | 7.00% | | |
| PYP-2-3 | 5.50% | | |
| CPGP-5-2 | 3.50% | | |
| CC-3-V1 | 5.00% | | |
| CC-5-V | 7.00% | | |

Example 10

| A liquid crystal mixture containing | | | |
|---|---|---|---|
| CY-3-O4 | 21.00% | cp. [° C.]: | 87.5 |
| CY-5-O4 | 14.00% | $\Delta n$ [589 nm, 20° C.]: | 0.1092 |
| CCY-3-O2 | 7.00% | $\Delta \epsilon$ [1 kHz, 20° C.]: | −4.8 |
| CCY-3-O3 | 6.00% | $K_1$ [20° C.]: | 15.0 |
| CCY-4-O2 | 5.50% | $K_3$ [20° C.]: | 16.1 |
| CPY-3-O2 | 11.00% | $K_3/K_1$ [20° C.]: | 1.08 |
| CCY-2-1 | 7.00% | $V_0$ [20° C.]: | 1.95 V |
| CCY-3-1 | 7.00% | | |
| PYP-2-3 | 5.00% | | |
| CPGP-5-2 | 4.50% | | |
| CC-3-V1 | 5.50% | | |
| CC-5-V | 6.50% | | |

Example 11

| A liquid crystal mixture containing | | | |
|---|---|---|---|
| CY-3-O4 | 24.50% | cp. [° C.]: | 88.5 |
| CCY-3-O2 | 8.00% | Δn [589 nm, 20° C.]: | 0.1098 |
| CCY-3-O3 | 8.00% | Δε [1 kHz, 20° C.]: | −4.2 |
| CCY-4-O2 | 8.00% | $K_1$ [20° C.]: | 13.2 |
| CCY-3-1 | 7.00% | $K_3$ [20° C.]: | 14.7 |
| PGP-2-3 | 10.00% | $K_3/K_1$ [20° C.]: | 1.11 |
| CPGP-5-2 | 7.00% | $V_0$ [20° C.]: | 1.97 V |
| CC-4-V | 15.50% | | |
| CK-3-F | 4.00% | | |
| CK-4-F | 4.00% | | |
| CK-5-F | 4.00% | | |

Example 12

| A liquid crystal mixture containing | | | |
|---|---|---|---|
| CY-3-O4 | 25.00% | cp. [° C.]: | 88.8 |
| CCY-3-O2 | 7.00% | Δn [589 nm, 20° C.]: | 0.1099 |
| CCY-3-O3 | 7.00% | Δε [1 kHz, 20° C.]: | −4.4 |
| CCY-4-O2 | 7.00% | $K_1$ [20° C.]: | 14.0 |
| CCY-5-O2 | 4.00% | $K_3$ [20° C.]: | 14.5 |
| CCY-3-1 | 6.00% | $K_3/K_1$ [20° C.]: | 1.04 |
| PGP-2-3 | 7.00% | $V_0$ [20° C.]: | 1.94 V |
| PGP-2-4 | 3.00% | | |
| CPGP-5-2 | 7.00% | | |
| CC-4-V | 15.00% | | |
| CK-3-F | 4.00% | | |
| CK-4-F | 4.00% | | |
| CK-5-F | 4.00% | | |

Example 13

| A liquid crystal mixture containing | | | |
|---|---|---|---|
| CY-3-O4 | 25.00% | cp. [° C.]: | 90.4 |
| CCY-3-O2 | 7.00% | Δn [589 nm, 20° C.]: | 0.1090 |
| CCY-3-O3 | 6.00% | Δε [1 kHz, 20° C.]: | −4.5 |
| CCY-4-O2 | 6.00% | $K_1$ [20° C.]: | 14.0 |
| CPY-3-O2 | 12.00% | $K_3$ [20° C.]: | 15.4 |
| PGP-2-3 | 4.00% | $K_3/K_1$ [20° C.]: | 1.10 |
| CPGP-5-2 | 6.00% | $V_0$ [20° C.]: | 1.96 V |
| CCP-V-1 | 7.00% | $\gamma_1$ [mPa·s, 20°]: | 187 |
| CC-4-V | 16.00% | LTS Bulk [−30° C.] | >1000 h |
| CK-3-F | 4.00% | | |
| CK-4-F | 3.00% | | |
| CK-5-F | 4.00% | | |

Example 14

| A liquid crystal mixture containing | | | |
|---|---|---|---|
| CY-3-O4 | 29.50% | cp. [° C.]: | 100.8 |
| CCY-2-1 | 10.50% | Δn [589 nm, 20° C.]: | 0.1329 |
| CCY-3-1 | 10.00% | Δε [1 kHz, 20° C.]: | −3.8 |
| CCY-3-O2 | 6.00% | $K_1$ [20° C.]: | 15.6 |
| CCY-4-O2 | 7.00% | $K_3$ [20° C.]: | 16.6 |
| CCY-3-O3 | 4.00% | $K_3/K_1$ [20° C.]: | 1.06 |
| PYP-2-3 | 7.00% | $V_0$ [20° C.]: | 2.18 V |
| PYP-2-4 | 6.00% | LTS Bulk [−20° C.] | >1000 h |
| BCH-32 | 14.00% | | |
| CPGP-5-3 | 3.00% | | |
| CPGP-5-2 | 3.00% | | |

Example 15

| A liquid crystal mixture containing | | | |
|---|---|---|---|
| CY-3-O4 | 32.00% | cp. [° C.]: | 100.6 |
| CY-5-O2 | 11.00% | Δn [589 nm, 20° C.]: | 0.1462 |
| CCY-3-O3 | 10.00% | Δε [1 kHz, 20° C.]: | −4.4 |
| CCY-5-O2 | 10.00% | $K_1$ [20° C.]: | 14.7 |
| PYP-2-3 | 8.00% | $K_3$ [20° C.]: | 17.3 |
| PYP-2-4 | 8.00% | $K_3/K_1$ [20° C.]: | 1.18 |
| BCH-32 | 2.00% | $V_0$ [20° C.]: | 2.09 V |
| CPGP-5-3 | 7.00% | | |
| CPGP-5-2 | 7.00% | | |
| CPGP-4-3 | 5.00% | | |

Example 16

| A liquid crystal mixture containing | | | |
|---|---|---|---|
| CY-3-O4 | 32.00% | cp. [° C.]: | 100.8 |
| CY-5-O2 | 7.00% | Δn [589 nm, 20° C.]: | 0.1303 |
| CCY-2-1 | 8.00% | Δε [1 kHz, 20° C.]: | −4.3 |
| CCY-3-O2 | 8.00% | $K_1$ [20° C.]: | 15.0 |
| CCY-4-O2 | 7.00% | $K_3$ [20° C.]: | 17.3 |
| CCY-3-O3 | 7.00% | $K_3/K_1$ [20° C.]: | 1.15 |
| PYP-2-3 | 6.00% | $V_0$ [20° C.]: | 2.12 V |
| BCH-32 | 13.00% | LTS Bulk [−20° C.] | >1000 h |
| CPGP-5-2 | 6.00% | | |
| CPGP-5-3 | 6.00% | | |

Example 17

| A liquid crystal mixture containing | | | |
|---|---|---|---|
| CY-3-O4 | 32.00% | cp. [° C.]: | 100.7 |
| CY-3-O4 | 29.00% | Δn [589 nm, 20° C.]: | 0.1320 |
| CY-5-O2 | 11.00% | Δε [1 kHz, 20° C.]: | −4.0 |
| CCY-2-1 | 7.00% | $K_1$ [20° C.]: | 16.1 |
| CCY-3-O2 | 8.00% | $K_3$ [20° C.]: | 17.3 |
| CCY-4-O2 | 7.00% | $K_3/K_1$ [20° C.]: | 1.07 |
| CCY-3-O3 | 4.50% | $V_0$ [20° C.]: | 2.16 V |
| PYP-2-3 | 6.00% | LTS Bulk [−20° C.] | >1000 h |
| BCH-32 | 15.50% | | |
| CPGP-5-2 | 6.00% | | |
| CPGP-5-3 | 6.00% | | |

Example 18

| A liquid crystal mixture containing | | | |
|---|---|---|---|
| CY-3-O4 | 32.00% | cp. [° C.]: | 104.7 |
| CY-5-O2 | 6.00% | Δn [589 nm, 20° C.]: | 0.1360 |
| CCY-2-1 | 8.00% | $K_1$ [20° C.]: | 16.7 |
| CCY-3-1 | 3.00% | $K_3$ [20° C.]: | 17.7 |
| CCY-3-O2 | 7.00% | $K_3/K_1$ [20° C.]: | 1.06 |
| CCY-4-O2 | 7.00% | $V_0$ [20° C.]: | 2.25 V |
| CCY-3-O3 | 5.00% | LTS Bulk [−20° C.] | >1000 h |
| PYP-2-3 | 8.00% | | |
| BCH-32 | 10.00% | | |
| CPGP-5-2 | 6.00% | | |
| CPGP-5-3 | 6.00% | | |
| CPGP-4-3 | 2.00% | | |

Example 19

| A liquid crystal mixture containing | | | |
|---|---|---|---|
| CY-3-O4 | 29.00% | cp. [° C.]: | 103.8 |
| CCY-2-1 | 10.00% | Δn [589 nm, 20° C.]: | 0.1331 |
| CCY-3-1 | 10.00% | $K_1$ [20° C.]: | 16.7 |
| CCY-3-O2 | 7.00% | $K_3$ [20° C.]: | 17.2 |
| CCY-4-O2 | 7.00% | $K_3/K_1$ [20° C.]: | 1.03 |
| CCY-3-O3 | 6.00% | $V_0$ [20° C.]: | 2.16 V |
| PYP-2-3 | 8.00% | LTS Bulk [−20° C.] | >1000 h |
| PYP-2-4 | 5.00% | | |
| BCH-32 | 11.00% | | |
| CPGP-5-3 | 3.00% | | |
| CPGP-5-2 | 3.00% | | |
| CPGP-4-3 | 1.00% | | |

Example 20

| A liquid crystal mixture containing | | | |
|---|---|---|---|
| CY-3-O2 | 7.00% | cp. [° C.]: | 84.5 |
| CY-3-O4 | 11.00% | Δn [589 nm, 20° C.]: | 0.1107 |
| CCY-3-O2 | 3.00% | | |
| CCY-3-O3 | 7.00% | | |
| CCY-4-O2 | 8.00% | | |
| CPY-2-O2 | 8.00% | | |
| CPY-3-O2 | 8.00% | | |
| CC-3-V | 20.50% | | |
| CC-5-V | 7.00% | | |
| CC-3-V1 | 6.00% | | |
| CPGP-5-2 | 1.50% | | |
| PYP-2-3 | 9.00% | | |
| PYP-2-4 | 4.00% | | |

The invention claimed is:

1. A liquid crystalline medium containing at least one compound of formula I, and at least one compound of formula IIj and/or IIk

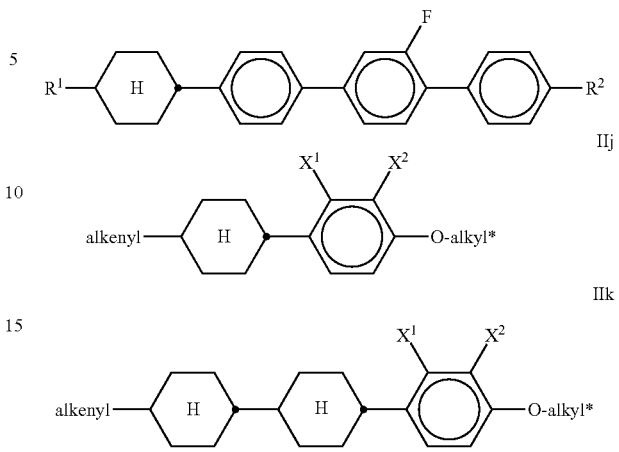

wherein
$R^1$ to $R^2$ are each independently alkyl or alkoxy with 1 to 8 C atoms, wherein one or more $CH_2$-groups are optionally replaced by —CH=CH—, —$CF_2$O or —O— in a way that —O— atoms are not linked directly to one another,
alkyl* denotes $C_{1-6}$-alkyl,
alkenyl denotes $C_{2-6}$-alkenyl, and
$X^1$ and $X^2$ are each independently F, Cl or $CF_3$.

2. A liquid crystalline medium according to claim 1, comprising one or more compounds of the following formulae

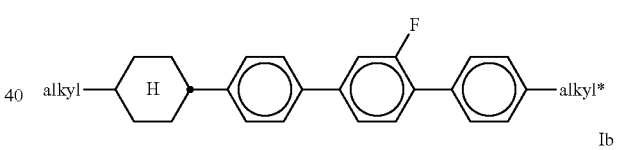

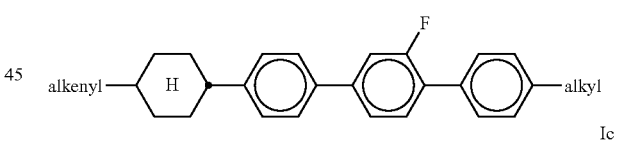

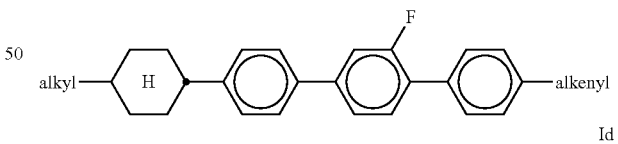

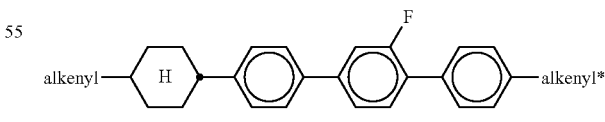

wherein
alkyl and alkyl* independently of each other denote $C_{1-6}$-alkyl and
alkenyl and alkenyl* independently of each other denote $C_{2-6}$-alkenyl.

3. A liquid crystalline medium according to claim 1, comprising one or more compounds of formula Ia Ia
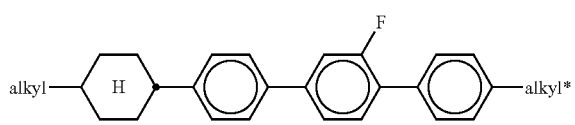
wherein
alkyl and alkyl* independently of each other denote $C_{1-6}$-alkyl.
4. A liquid crystalline medium according to claim 1, further comprising one or more compounds of the following formulae IIa to IIi and/or III to IIr,
IIa
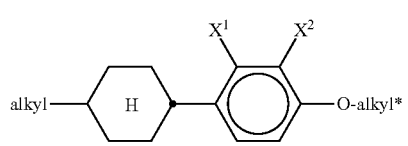
IIb
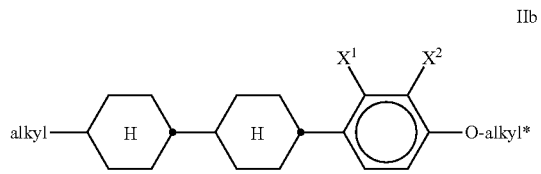
IIc
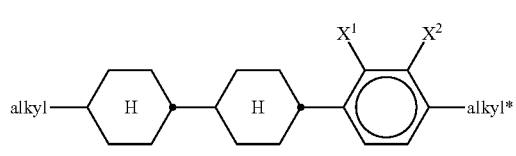
IId
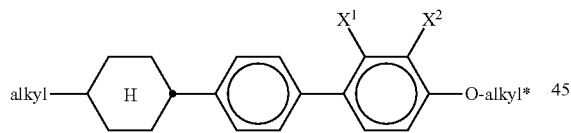
IIe
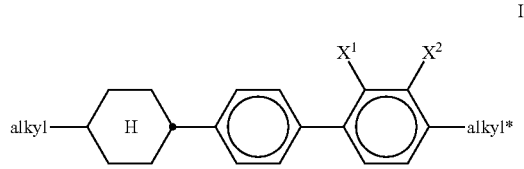
IIf
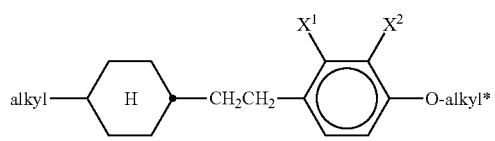
IIg
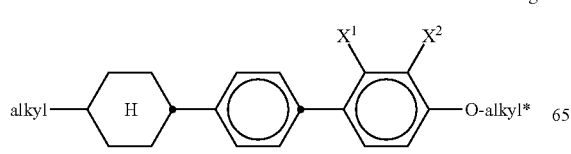
IIh
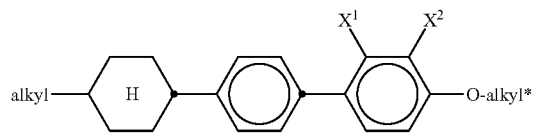
IIi
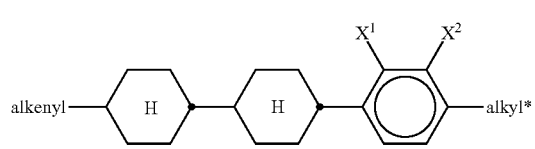
IIl
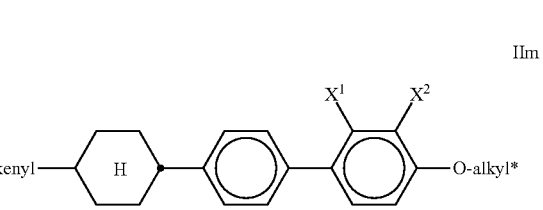
IIm
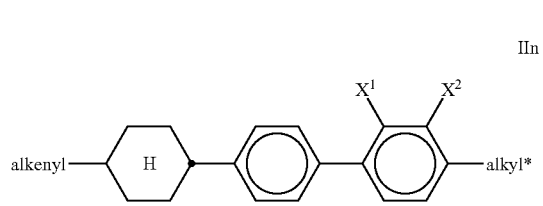
IIn
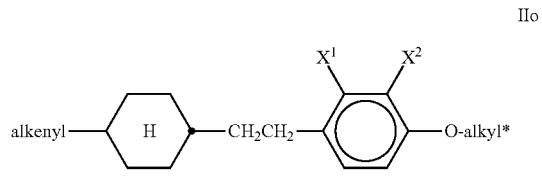
IIo
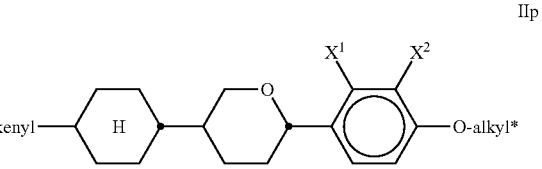
IIp
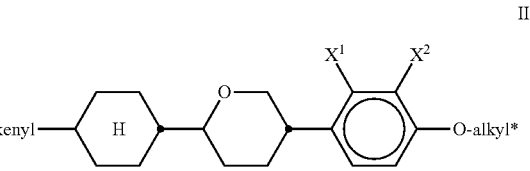
IIq
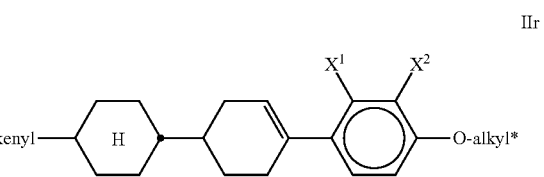
IIr
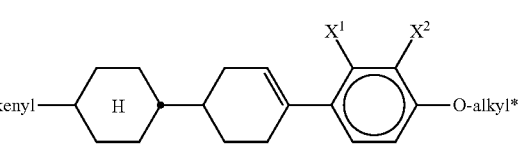

-continued

IIi
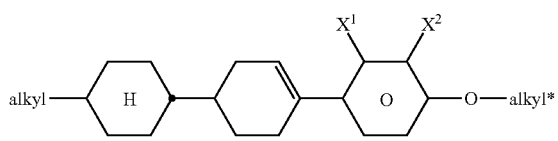

wherein
alkyl and alkyl* independently of each other denote $C_{1-6}$-alkyl,
alkenyl denotes $C_{2-6}$-alkenyl, and
$X^1$ and $X^2$ are each independently F, Cl or $CF_3$.

5. A liquid crystalline medium according to claim 1, further comprising one or more compounds of formula III III
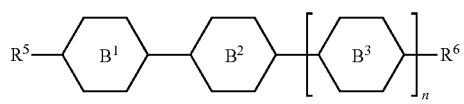

wherein
$R^5$ and $R^6$ are independently of each other alkyl or alkoxy with 1 to 8 C atoms, wherein one or more $CH_2$-groups are optionally replaced by —CH═CH—,

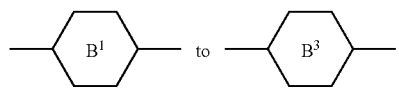

are independently of each other

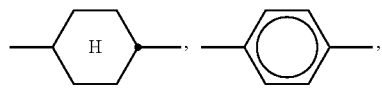

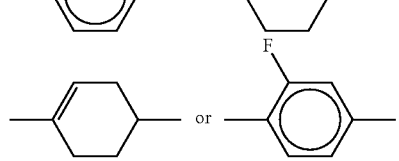

and
n is 0 or 1.

6. A liquid crystalline medium according to claim 5, comprising one or more compounds of formulae IIIa to IIIn IIIa
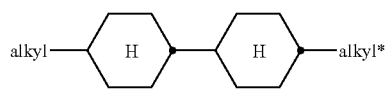

IIIb
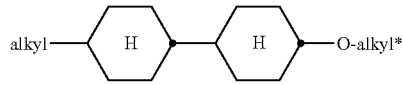

IIIc
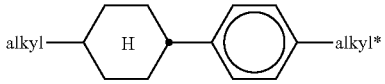

IIId
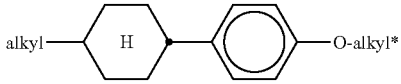

IIIe
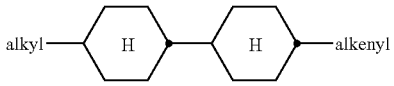

IIIf
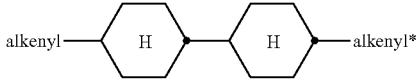

IIIg
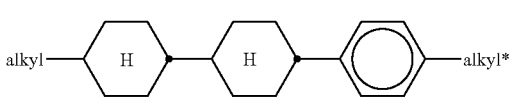

IIIh
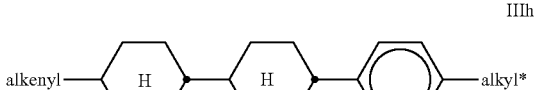

IIIi
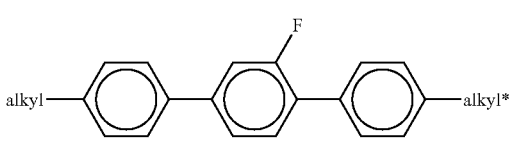

IIIj
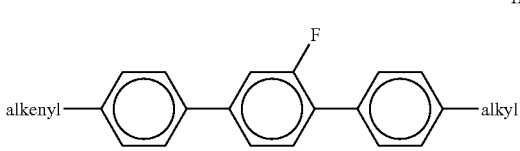

IIIk
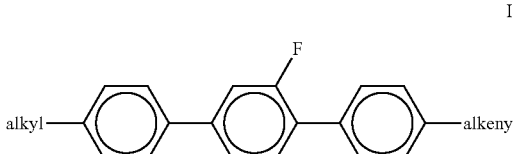

IIIl
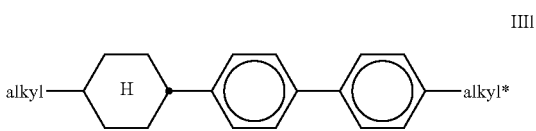

IIIm
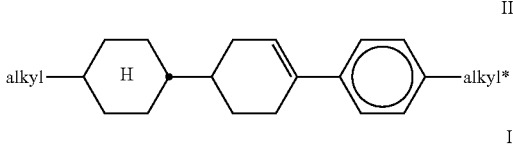

IIIn
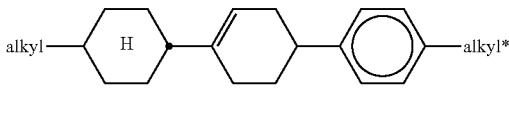

wherein
alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

7. A liquid crystalline medium according to claim 5, wherein the proportion of the compound of formula III in the liquid crystalline medium as a whole is 3 to 50% by weight.

8. A liquid crystalline medium according to claim 1, wherein the proportion of the compounds of formula I in the liquid crystalline medium as a whole is 1 to 30% by weight.

9. A liquid crystalline medium according to claim 1, wherein the proportion of the compound of formula IIj and/or IIk in the liquid crystalline medium as a whole is at least 30% by weight.

10. A liquid crystalline medium according to claim 1, further comprising a compound of Z-15

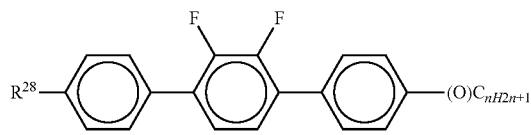

wherein
R$^{28}$ is alkyl or alkoxy with 1 to 8 C atoms, wherein one or more CH$_2$-groups are optionally replaced by —CH=CH—, —CF$_2$O or —O— in a way that —O— atoms are not linked directly to one another, and
n is 1 to 6.

11. A liquid crystalline medium according to claim 1, further comprising one or more biphenyl or terphenyl compounds of formula T-1 and/or B-1

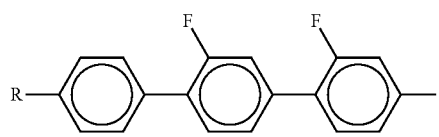

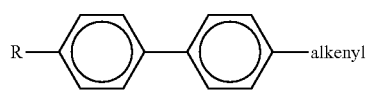

in which
R denotes alkyl, alkenyl, alkoxy, alkylalkoxy or alkenyloxy having 1 or 2 to 6 C atoms, and
alkenyl denotes a straight-chain alkenyl radical having 2-6 C atoms.

12. A liquid crystalline medium according to claim 1, further comprising one or more compounds of formula P-1 to P-6

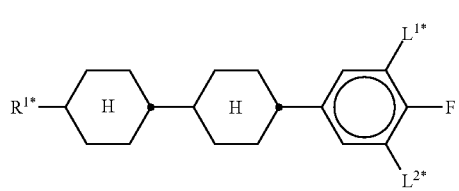

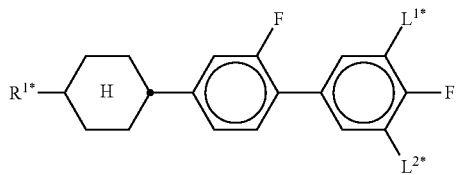

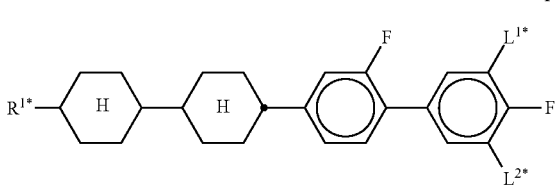

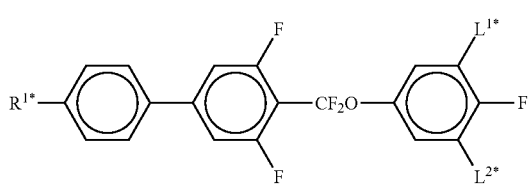

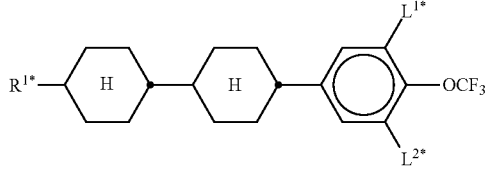

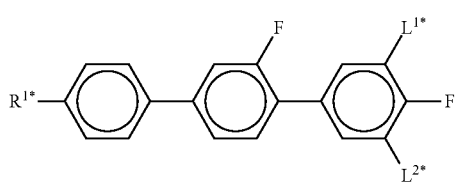

in which
R$^{1*}$ is alkyl or alkoxy with 1 to 8 C atoms, wherein one or more CH$_2$-groups are optionally replaced by —CH=CH—, —CF$_2$O or —O— in a way that —O— atoms are not linked directly to one another, and
L$^{1*}$ and L$^{2*}$ each independently of one another denote H or F.

13. A liquid crystalline medium according to claim 1, further comprising one or more indane compounds of formulae In-1 to In-18

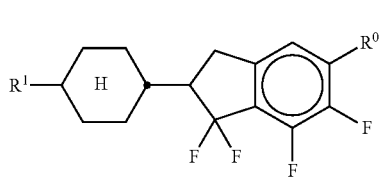

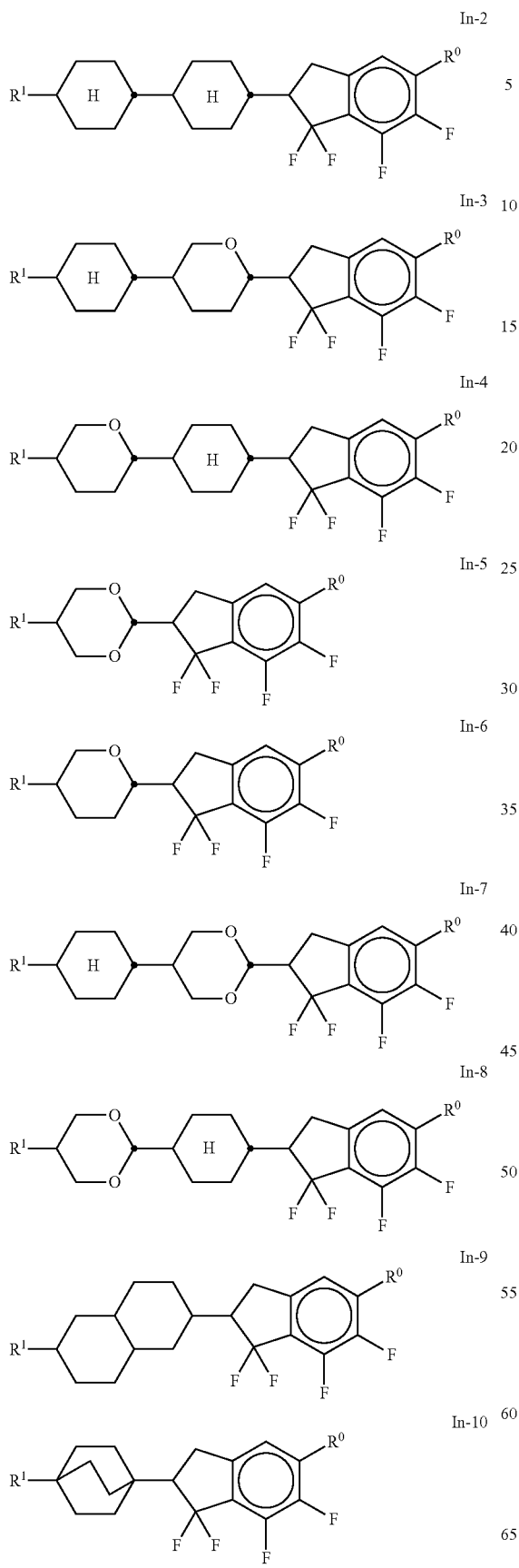
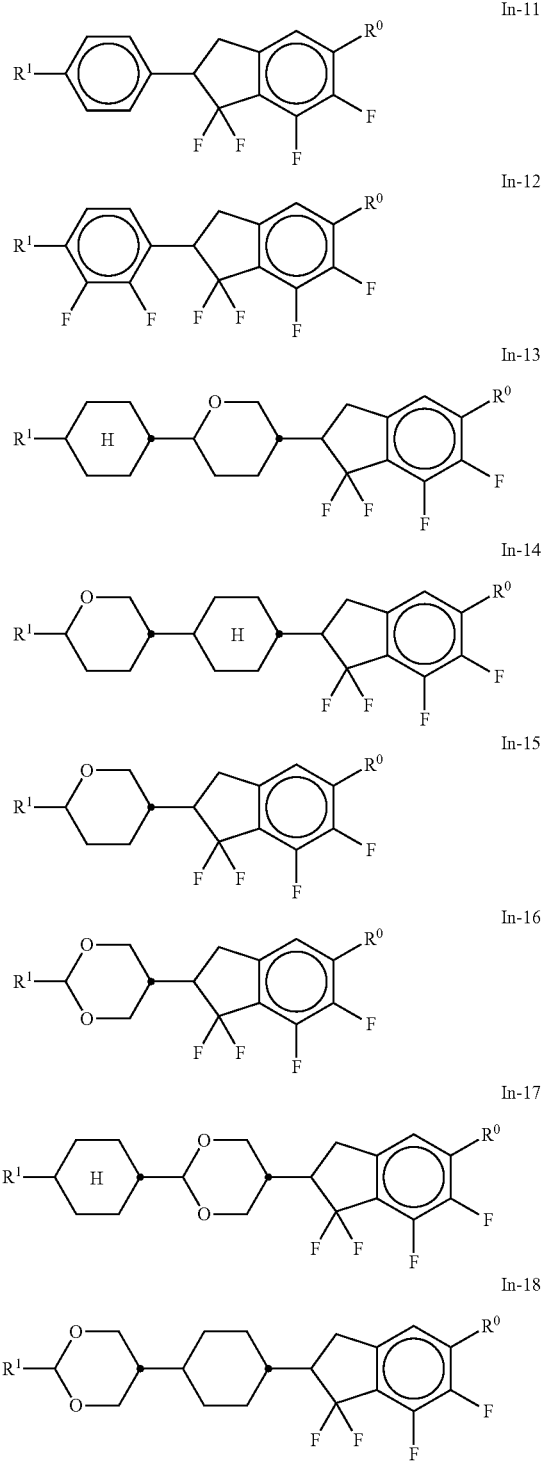
wherein
R¹ and R⁰ are each independently alkyl or alkoxy with 1 to 8 C atoms, wherein one or more CH$_2$-groups are optionally replaced by —CH=CH—, —CF$_2$O or —O— in a way that —O— atoms are not linked directly to one another.
14. A liquid crystalline medium according to claim 1, further comprising one or more indane compounds of formulae In-1 to In-18

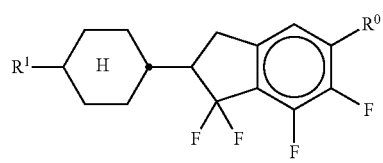
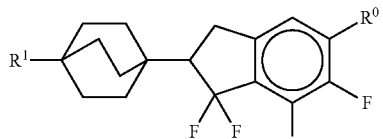

wherein
- $R^1$ denotes a straight-chain alkyl radical having 1-6 C atoms or a straight-chain alkenyl radical having 2-6 C atoms, and
- $R^0$ denotes H or a straight-chain alkyl radical having 1-6 C atoms.

15. A liquid crystalline medium according to claim 1, further comprising one or more indane compounds of the following formulae

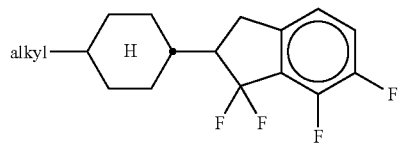

In-1a

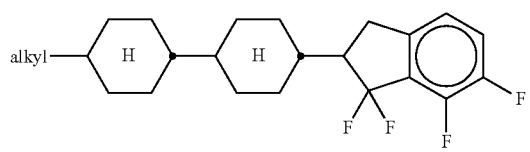

In-2a

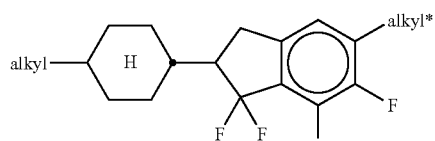

In-1b

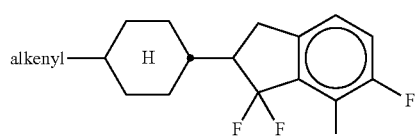

In-1c

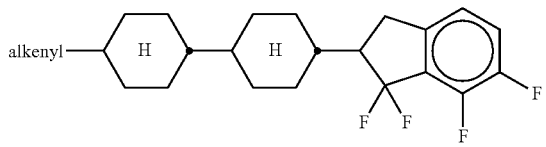

In-2b

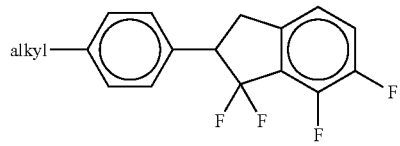

In-11a

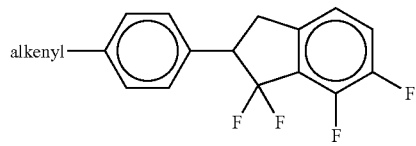

In-11b wherein
- alkyl and alkyl* each, independently of one another, denote a straight-chain alkyl radical having 1-6 C atoms, and
- alkenyl denotes a straight-chain alkenyl radical having 2-6 C atoms.

16. A liquid crystalline medium according to claim 1, further comprising one or more UV absorbers, nanoparticles, nanobeeds, microparticles, antioxidants and/or free-radical scavengers.

17. A liquid crystalline medium according to claim 1, further comprising a compound of formula CK-n-F

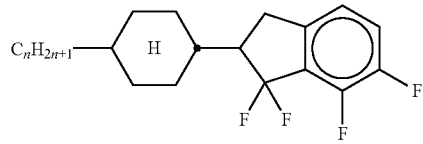

CK-n-F in which n is 1-6.

18. A liquid crystalline medium according to claim 1, further comprising a compound of formula II, which is not a compound of formula IIj or IIk,

II $$R^3-\boxed{H}-Z^1-\left[\boxed{A}\right]_m-Z^2-\boxed{\phantom{X}}^{X^1\ X^2}-R^4$$

wherein
- $R^3$ to $R^4$ are each independently alkyl or alkoxy with 1 to 8 C atoms, wherein one or more $CH_2$-groups are optionally replaced by —CH=CH—, —$CF_2$O or —O— in a way that —O— atoms are not linked directly to one another,

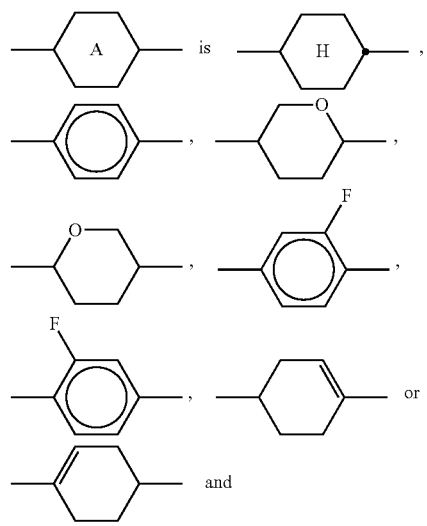

- $X^1$ and $X^2$ are each independently F, Cl or $CF_3$,
- $Z^1$ and $Z^2$ are each independently a single bond, —$CH_2CH_2$—, —$CH_2O$—, —$OCH_2$—, —$CF_2O$—, —$OCF_2$—, or —COO—, and
- m is 0 or 1.

19. A liquid crystalline medium according to claim 1, which comprises a compound of formula IIj,

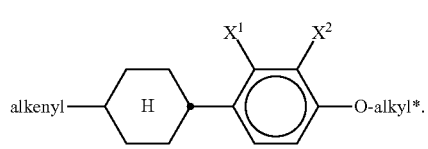

IIj

20. A liquid crystalline medium according to claim 1, which comprises a compound of formula IIk,

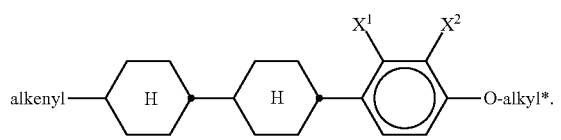

IIk

21. A method for achieving an electrooptical effect, comprising addressing a liquid crystalline medium according to claim 1.

22. An electrooptical liquid crystal display containing a liquid crystalline medium according to claim 1.

23. An electrooptical display according to claim 22, which has active matrix addressing and is based on the ECB, VA, ASV, PS-VA, MVA, FFS or PALC mode.

* * * * *

UNITED STATES PATENT AND TRADEMARK OFFICE
CERTIFICATE OF CORRECTION

PATENT NO. : 8,685,275 B2  Page 1 of 1
APPLICATION NO. : 13/869392
DATED : April 1, 2014
INVENTOR(S) : Norihiko Tanaka et al.

It is certified that error appears in the above-identified patent and that said Letters Patent is hereby corrected as shown below:

In the Claims:

Column 55, lines 1-8 (Claim 4), the shown compound

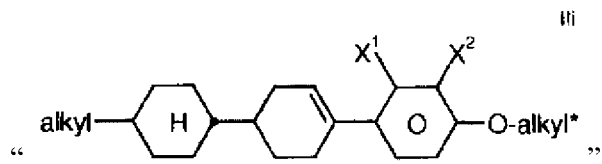

should be deleted.

Signed and Sealed this
Twelfth Day of August, 2014

Michelle K. Lee
*Deputy Director of the United States Patent and Trademark Office*